(12) United States Patent
Pao

(10) Patent No.: US 11,668,926 B2
(45) Date of Patent: Jun. 6, 2023

(54) LIGHT GUIDE MIRROR ASSEMBLY AND APPLICATIONS THEREOF

(71) Applicant: Wei-Yuan Pao, Taoyuan (TW)

(72) Inventor: Wei-Yuan Pao, Taoyuan (TW)

( * ) Notice: Subject to any disclaimer, the term of this patent is extended or adjusted under 35 U.S.C. 154(b) by 216 days.

(21) Appl. No.: 17/365,561

(22) Filed: Jul. 1, 2021

(65) Prior Publication Data

US 2022/0035151 A1    Feb. 3, 2022
US 2022/0035151 A1    Feb. 3, 2022

(30) Foreign Application Priority Data

Jul. 30, 2020 (TW) .................................. 109125878

(51) Int. Cl.
| | | |
|---|---|---|
| G02B 26/08 | (2006.01) |
| G02B 5/04 | (2006.01) |
| G02B 27/00 | (2006.01) |
| G02B 7/18 | (2021.01) |
| G02B 19/00 | (2006.01) |

(52) U.S. Cl.
CPC ......... G02B 26/0883 (2013.01); G02B 5/045 (2013.01); G02B 7/1805 (2013.01); G02B 19/0042 (2013.01); G02B 27/0006 (2013.01)

(58) Field of Classification Search
CPC .. G02B 26/0883; G02B 5/045; G02B 7/1805; G02B 19/0042; G02B 27/0006; G02B 19/0009; G02B 19/0019; G02B 27/00; G02B 19/0004; G02B 19/0038
See application file for complete search history.

(56) References Cited

U.S. PATENT DOCUMENTS 5,729,387 A  *  3/1998  Takahashi ............... F24S 23/00
                                                        359/591

FOREIGN PATENT DOCUMENTS

| CN | 1395058 A | 2/2003 |
| CN | 101904016 A | 12/2010 |
| CN | 102007434 A | 4/2011 |
| CN | 102012536 A | 4/2011 |
| CN | 111225780 A | 6/2020 |
| JP | S61-180217 A | 8/1986 |

(Continued)

OTHER PUBLICATIONS

Search Report of TW 109125878 dated Mar. 15, 2021.

*Primary Examiner* — James C. Jones
(74) *Attorney, Agent, or Firm* — Demian K. Jackson; Jackson IPG PLLC

(57) ABSTRACT

The present invention relates to a light guide mirror assembly, which includes at least two thin prisms in combination with a rotating module. The thin prisms are oriented to direct the light beam towards the designated spot. The bases carrying the thin prisms are fixed by base fasteners or a moveable holder module, and the thin prisms are adjusted in terms of the spacings among them, the inclined angle thereof and the settings thereof to improve the output orientation and beam convergence of the light beam. The invention is useful in illumination, photo-thermal power generation, photovoltaic power generation, heat extraction air conditioner and light beam communication. The invention is also useful in other applications, such as weather control, fire extinguishment, pest control, energy transmission, telecommunication, rock cutting, molten lava casting and light beam probing.

22 Claims, 13 Drawing Sheets

(56) References Cited

FOREIGN PATENT DOCUMENTS

| | | |
|---|---|---|
| TW | M304644 U | 1/2007 |
| TW | I400485 B | 7/2013 |
| TW | 201736103 A | 10/2017 |

\* cited by examiner

LIGHT GUIDE MIRROR ASSEMBLY AND APPLICATIONS THEREOF

PRIORITY CLAIM

This application claims priority to R.O.C. Patent Application No. 109125878 filed Jul. 30, 2020, the entirety of which is incorporated herein by reference.

BACKGROUND OF THE INVENTION

Field of the Invention

The present invention relates generally to a light guide mirror assembly for directing an output path of light towards a designated spot and further relates to the applications of the light guide mirror assembly.

Description of Related Art

The conventional light collecting apparatus, such as that disclosed in R.O.C. Utility Model No. M304644, are generally configured in the form of a solar concentrator panel having a large surface area and composed of multiple concentrator plates made of glass or acrylics. Each of the solar concentrator plates corresponds to a single solar cell, so that every solar cell may efficiently receive solar energy with an enhanced energy density through the light concentrator plate corresponding thereto. However, the conventional solar concentrator panel has to be precisely oriented towards the sun, so as to transmit solar energy to the respective solar cells. To achieve this, sophisticated mechanical facilities are required to keep the large-area solar panel facing the sun and, as a result, the occurrence of mechanical failure and the problem that the sunlight is blocked by the neighboring apparatuses seem inevitable and unsolvable. Furthermore, the conventional systems are unable to control the output direction and position of light beams under static installation conditions. Neither are they equipped with an effective mechanism for processing the photovoltaic and photo-thermal frequency bands in a separate manner to allow separate collection and utilization of solar and thermal energy with minimal engineering cost and mechanical disturbance.

Another light collecting apparatus is disclosed in R.O.C. Patent No. 1400485, which relates to a prism array for collecting external light. The prism array includes a first light collecting prism assembly comprising a first light guide prism and at least one first reflective prism. The first light guide prism includes a first light incident surface, a first reflective surface, a first light concentrating surface, a first light transmission surface and a first light exit surface, wherein the external light entering the first light guide prism through the first light concentrating surface is reflected by the first reflective surface in a first direction and then leaves the first light guide prism via the first light exit surface. The first reflective prism is disposed adjacent to the first light exit surface, such that the first reflective prism receives the external light through the first light exit surface and reflects the external light to constitute a first light beam which is then output in a second direction. This conventional prism array is useful for collecting sunlight and other light sources for indoor illumination, conversion to electricity via solar cells and other applications. While the conventional prism array may output light beam in a second direction and this output direction may be adjusted by changing the orientation of the first light collecting prism assembly, such adjustment of output direction is too limited to satisfy a user's demand as the incident external light is at a fixed angle with respect to the output light beam. The prism array, similar to the conventional light collecting apparatus described above, is unable to process the photovoltaic and photo-thermal frequency bands in a separate manner to allow separate collection and utilization of solar and thermal energy with minimal engineering cost and mechanical disturbance.

SUMMARY OF THE INVENTION

To overcome the drawbacks described above, the invention provides a light guide mirror assembly for directing an output path of light towards a designated spot, as well as the application thereof.

In one aspect provided herein is a light guide mirror assembly, which comprises at least two thin prisms (which are hereinafter regarded as a basic unit) superimposed in a first direction and arranged with predetermined spacing, inclined angle and setting. Each of the thin prisms has a bottom surface formed with a plurality of triangular microstructures extending in parallel following predetermined routes and directions, a light incident surface opposite to the bottom surface and a side face. Each of the triangular microstructures comprises a vertical face substantially perpendicular to the bottom surface and an inclined face at an acute angle smaller than 90° with respect to the bottom surface. The light incident surfaces of the at least two thin prisms are oriented towards the same side with respect to the first direction and arranged with predetermined spacing, inclined angle and setting. The light guide mirror assembly disclosed herein is referred to as at least one basic unit. the mirror assembly may include that with multiple basic units, with every basic unit being arranged with predetermined spacing, inclined angle and setting. The thin prisms are classified into a focusable thin prism, a virtual focus thin prism and a no-focus thin prism. The triangular microstructures of the focusable thin prism extend in parallel following arc-shaped routes on the bottom surface. The vertical faces of the triangular microstructures are oriented towards the inner side of the arc line and have a focus or an off-axis focus. The inclined face and the arc line form a convex surface. The triangular microstructures of the virtual focus thin prism extend in parallel following arc-shaped routes on the bottom surface. The vertical faces of the triangular microstructures are oriented towards the outer side of the arc line and has a virtual focus or an off-axis virtual focus. The inclined face and the arc line form a concave surface. The triangular microstructures of the no-focus thin prism extend in parallel following straight routes on the bottom surface. The vertical faces of the triangular microstructures are oriented towards a designated side. The thin prisms are independently selected from a focusable thin prism, a virtual focus thin prism and a no-focus thin prism. The mirror assembly also comprises one or more bases or universal tubes, wherein the at least two thin prisms are resided at a position selected from the group consisting of the one or more bases, accommodation recesses on the one or more bases, the one or more universal tubes, and accommodation recesses in the one or more universal tubes. The mirror assembly also comprises at least one prism rotating module mounted at a position selected from the group consisting of the one or more bases, an accommodation recess on the one or more bases, the one or more universal tubes and an accommodation recess in the one or more universal tubes, and connected to one of the at least two thin prisms, so that the one of the at least two thin prisms is adapted for being driven to rotate around the first direction or a direction at the inclined angle. The bases are secured by a base fastener or a moveable holder module, so that the bases are secured to either have fixed spacing, inclined angle and setting, or have variable height, angle, orientation or setting. The moveable holder module includes but not limited to a lifter device, a steering arm, a swinging device, a base rotating module, a telescopic slide member or a flipping/rolling device. The mirror assembly also comprises a Electromechanical control system and interface connected to and adapted to control the prism rotating module and the moveable holder module. An optical path sensor is optionally disposed in front of, behind or onto the at least two thin prisms. The optical path sensor is an accessory part combined with or without the at least two thin prisms. The optical path sensor is provided with a plurality of photosensors, with either all of the photosensors being adapted for detecting light beams projected along the same direction, or some of the photosensors being adapted for detecting light beams projected along different directions. The optical path sensor is so connected to the Electromechanical control system and interface as to control output of light beams. The thin prisms are selected from the group consisting of a Fresnel prism, a Fresnel lens and other prisms. The at least one basic unit is provided nearby with a reflective mirror or a reflective lens, which is arranged with predetermined spacing, inclined angle and setting and secured by a fastener or the moveable holder module. The mirror assembly is surrounded by a signal reflection casing configured without blocking the front and rear sides of the light guide mirror assembly. The signal reflection casing is formed at its front and rear ends with at least one light beam outlet/inlet, respectively. The light guide mirror assembly is further provided at its rear side with at least one first signal loading module, which is electrically connected to the Electromechanical control system and interface. The signal reflection casing is further provided at its outer layer or front side with at least one second signal loading module, which is electrically connected to the Electromechanical control system and interface. The mirror assembly is useful in illumination, heat application, photo-thermal power generation, photovoltaic power generation, heat extraction air conditioner and thermal storage, and adapted for adjusting beam convergence and energy distribution at various sites and in cooperation with various devices according to instructions, or for tracking and directing light beams towards a moveable target. The light beams output from the light guide mirror assembly is re-concentrated into a directional light beam with a greatly increased application distance, which is useful in cutting large objects, such as rocks, buildings and tunnels, reforming landscape, heating sandstone into molten lava which is cast-molded for construction use, directional beam communication, light beam probing and light beam energy transmission.

In another aspect provided herein is a variable-focus light guide mirror assembly, which comprises at least one light guide mirror assembly described above. The thin prisms are independently selected from a focusable thin prism, a virtual focus thin prism and a no-focus thin prism. That is to say, the variable-focus light guide mirror assembly may comprise any type and amount of the thin prisms described above. The variable-focus light guide mirror assembly further comprises at least one of the following technical features. The bases are arranged with predetermined spacing, inclined angle and setting and in staggered relation, in variable quantities at different layers, in array to constitute the polyhedral architecture, or in variable relation by provided with a moveable holder module. The moveable holder module includes but not limited to a lifter device, a steering arm, a swinging device, a base rotating module, a telescopic slide member or a flipping/rolling device, so that the bases and the thin prisms are secured to either have fixed spacing, inclined angle and setting, or have variable height, angle, orientation or setting. An optical path sensor is optionally disposed in front of, behind or onto the at least two thin prisms. The optical path sensor is an accessory part combined with or without the at least two thin prisms. The optical path sensor is provided with a plurality of photosensors, with either all of the photosensors being adapted for detecting light beams projected along the same direction, or some of the photosensors being adapted for detecting light beams projected along different directions. The optical path sensor is so connected to the Electromechanical control system and interface as to control output of light beams. The at least one basic unit is provided nearby with a reflective mirror or a reflective lens, which is arranged with predetermined spacing, inclined angle and setting and secured by a fastener or the moveable holder module. The mirror assembly is surrounded by a signal reflection casing configured without blocking the front and rear sides of the light guide mirror assembly. The signal reflection casing is formed at its front and rear ends with at least one light beam outlet/inlet, respectively. The light guide mirror assembly is further provided at its rear side with at least one first signal loading module, which is electrically connected to the Electromechanical control system and interface. The signal reflection casing is further provided at its outer layer or front side with at least one second signal loading module, which is electrically connected to the Electromechanical control system and interface. The variable-focus light guide mirror assembly is useful for the same applications as described above.

In a preferred embodiment, the first and second signal loading modules are independently selected from the group consisting of a liquid crystal module, a piezoelectric module, an electrically controlled polarization module, an electroactive polymer, laser communication technology, wireless communication technology or wire communication technology.

In a preferred embodiment, the acute angle is smaller than 45°.

In a preferred embodiment, the prism rotating module has a prism gear/pulley, a prism rotating member and a prism power member. The prism gear/pulley is fabricated to surround the thin prism by edge machining or additional installation. The prism rotating member is mounted within an accommodation recess on the base or on the universal tube and engages the prism gear/pulley. The prism power member is connected to the Electromechanical control system and interface and coupled to the prism gear/pulley or the prism rotating member.

In a preferred embodiment, the prism rotating module further comprises a securing member disposed between the prism gear/pulley and the prism rotating member or within an accommodation recess on the base or on the universal tube, so as to stabilize the prism gear/pulley.

In a preferred embodiment, the moveable holder module is a lifter device comprising a base gear, a lifter screw, a base motor and a base transmission member. The base gear and the base transmission member are mounted circumferentially on the base, and the base is adapted for being mounted with a variable-focus thin prism, a convex lens or a concave lens. The base gear engages the lifter screw, while the base transmission member engaged with the base gear. The base motor is connected to the base transmission member and the Electromechanical control system and interface, respectively. Alternatively, the moveable holder module is a steering arm comprising a horizontal rotating module and a pitch angle lifting/rotary module. Still alternatively, the moveable holder module is a swinging device with swinging function, which is selected from the group consisting of a telescopic module, a bearing, a universal tube, a base rotating module, a telescopic slide member and a flipping/rolling module, and mounted on or between the bases.

In a preferred embodiment, the light guide mirror assembly or the thin prisms are installed, alone or in array, on a flat weatherproof sealing structure and the sealing structure is in turn mounted on a conventional roof, wherein the flat weatherproof sealing structure is shaped to have a planar, a bell-like, a spheric and a curved surface, and wherein the flat weatherproof sealing structure is directly mounted on, replaces or constitutes the roof, or the flat weatherproof sealing structure is installed on a stable platform or static plane built on a high place, or a plurality of the flat weatherproof sealing structures are fabricated into a polyhedral architecture adapted for receiving more light as compared with a single piece of the planar-shaped flat weatherproof sealing structure, and wherein the polyhedral architecture may be selected from a trihedral architecture composed of either three pieces of the planar-shaped flat weatherproof sealing structures or two pieces of the planar-shaped flat weatherproof sealing structures in combination with the ground surface, a tetrahedral architecture composed of either four pieces of the planar-shaped flat weatherproof sealing structures or three pieces of the planar-shaped flat weatherproof sealing structures in combination with the ground surface, or other polyhedral architectures. The flat weatherproof sealing structure is surrounded by the one or more bases and/or the signal reflection casing. The bases are arranged with predetermined spacing, inclined angle and setting and in staggered relation, in variable quantities at different layers, in array to constitute the polyhedral architecture, or in variable relation by provided with a moveable holder module.

In a preferred embodiment, the light guide mirror assembly, the thin prisms or the flat weatherproof sealing structure is/are installed, alone or in array, on a hover vehicle or a space-based vehicle selected from the group consisting of an aerostat platform, a mechanical air-staying platform, an orbital platform, a powered hover platform. The light guide mirror assembly installed on the hover vehicle or the space-based vehicle is useful for outdoors weather control, pest control and fire extinguishment.

In a preferred embodiment, the light guide mirror assembly, the thin prisms or the flat weatherproof sealing structure is/are installed, alone or in array, on a dynamic steering tracking platform which comprises a light source vector sensor, a steering arm or a swinging device. The light source vector sensor, the dynamic steering tracking platform or the steering arm or the swinging device are electrically connected to the Electromechanical control system and interface. The steering arm comprises a horizontal rotating module and a pitch angle lifting/rotary module and is usually mounted next to the mirror assembly, the thin prisms or the dynamic steering tracking platform. The swinging device is selected from the group consisting of a telescopic module, a bearing, a universal tube, a base rotating module, a telescopic slide member, a flipping device or a rolling device, and adapted to swing or move the mirror assembly, the at least two thin prisms or the flat weatherproof sealing structure.

In another preferred embodiment, the mirror assembly further comprises a plurality of light pipes which comprise light receiving ends arranged in intensive array beneath an output side of the mirror assembly and terminal ends arranged in communication with a plurality of light-shielded spaces or dead corners, where light cannot arrive unless transmitted through the light pipes, and wherein the light beams output from the mirror assembly can be directed to the light pipes. The light receiving end and the terminal ends are either secured at fixed positions or moveable by being mounted on a translational member or a mobile member. The terminal ends of the light pipes are provided with or without an adjustable reflective mirror, an optical diffuser or a light scatterer, as a means to adjust the output at the terminal ends.

DETAILED DESCRIPTION OF THE INVENTION

Figure 1:
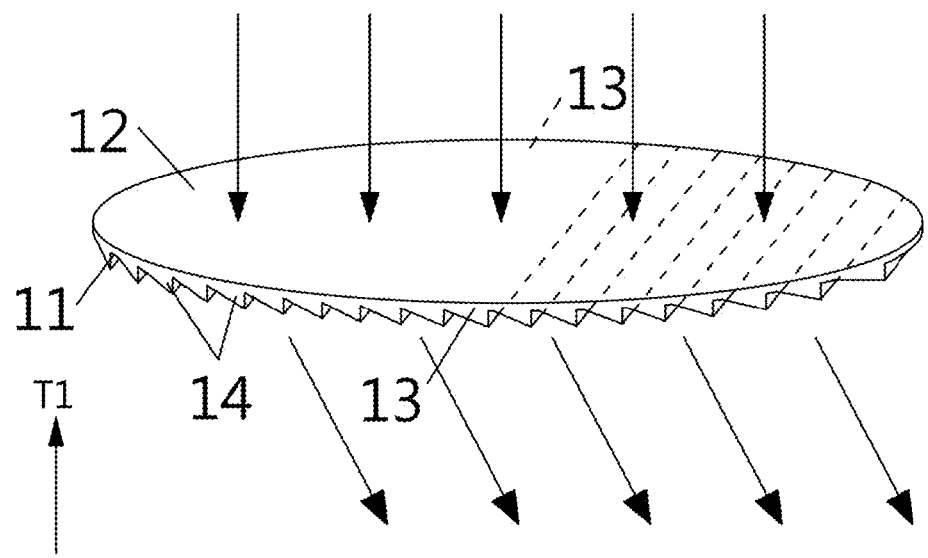
FIG. 1 is a perspective schematic diagram of the thin prism according to an embodiment of the invention.
Figure 2:
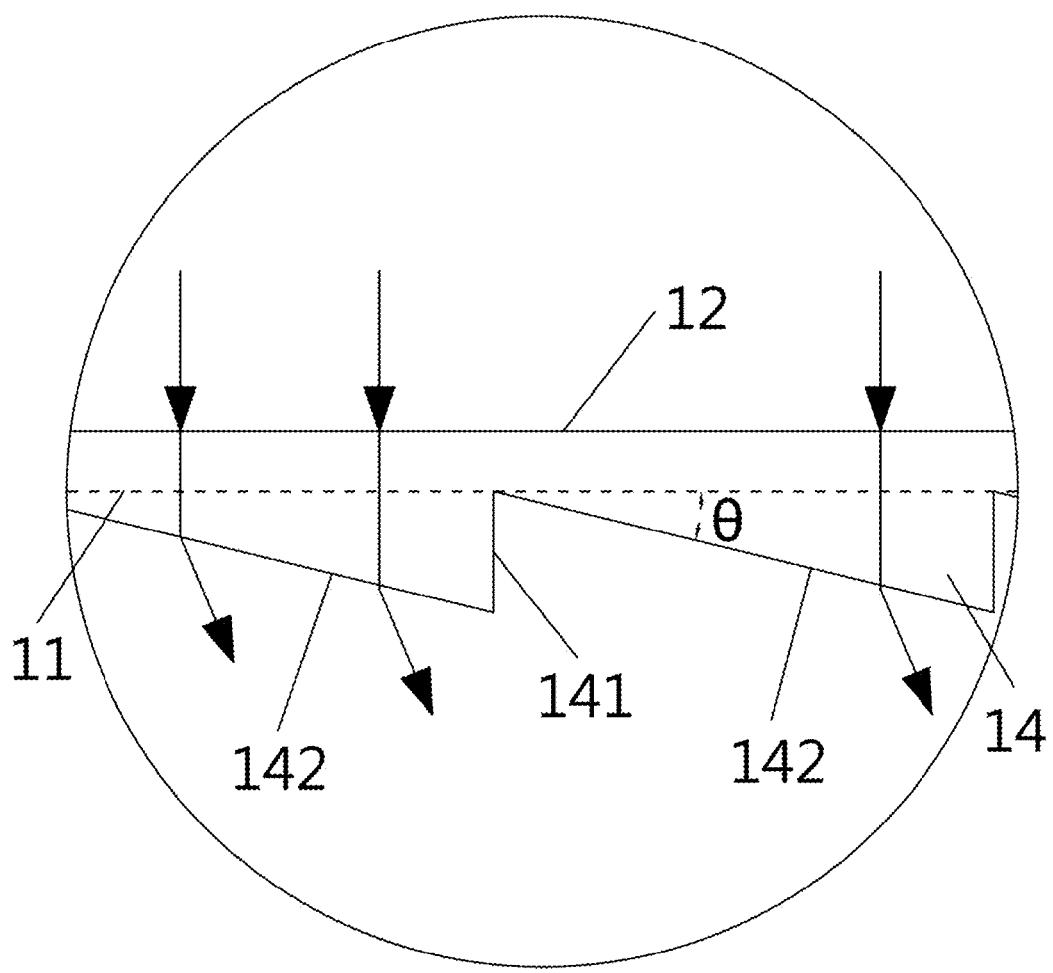
FIG. 2 is a partial enlarged schematic diagram of the thin prism according to an embodiment of the invention.
Figure 7:
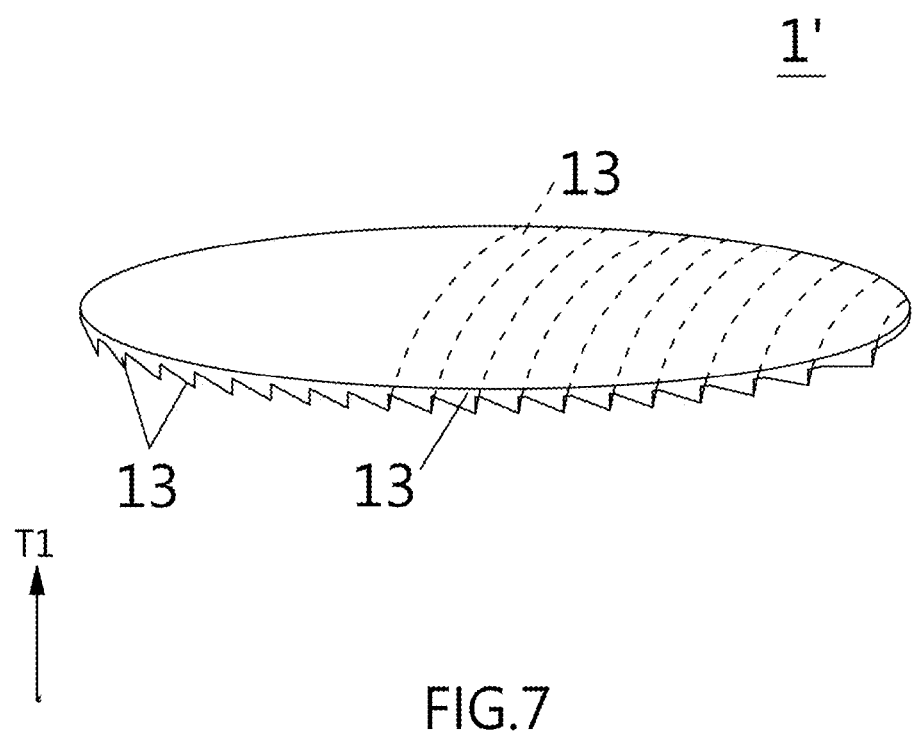
FIG. 7 is a schematic diagram of the thin prism according to another embodiment of the invention.

FIG. 1 and FIG. 7 show the thin prisms according to the invention, and FIG. 2 further shows a partial enlarged view thereof. The thin prisms 1, 1' disclosed herein have a plate-shaped configuration and are made of transparent material with a fixed optical refractive index. The thin prisms may be Fresnel prisms. The thin prism 1 includes a bottom surface 11 formed with a plurality of triangular microstructures 14 extending in parallel following predetermined routes and directions, a light incident surface 12 opposite to the bottom surface 11 along a first direction T1, and a side surface 13. According to the embodiments shown in the drawings, the thin prism 1 is configured in the form of a disc-shaped body, and each of the triangular microstructures 14 has a vertical face 141 substantially perpendicular to the bottom surface 11 and an inclined face 142. All of the vertical face 141 are oriented in the same direction, and each of the inclined face 142 is at an acute angle θ smaller than 90°, preferably at an acute angle θ smaller than 45°, relative to the bottom surface 11, taking advantage of the fact that the smaller the angle is, the fewer the useless angle is and the less the refraction offset is. The thin prism may be selected from a focusable thin prism, a virtual focus thin prism, or a no-focus thin prism.

Figure 3:
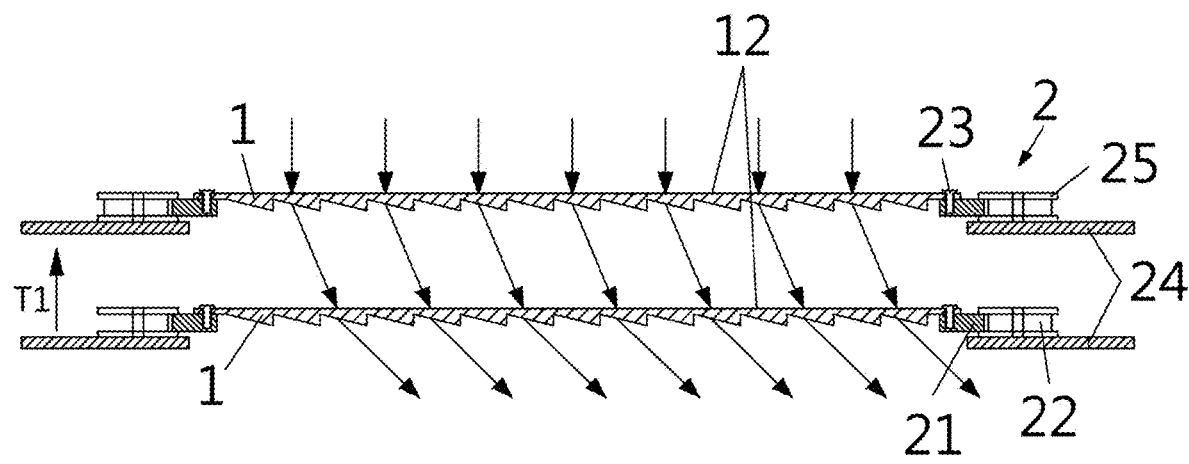
FIG. 3 is a schematic diagram of the light guide mirror assembly according to an embodiment of the invention.
Figure 4:
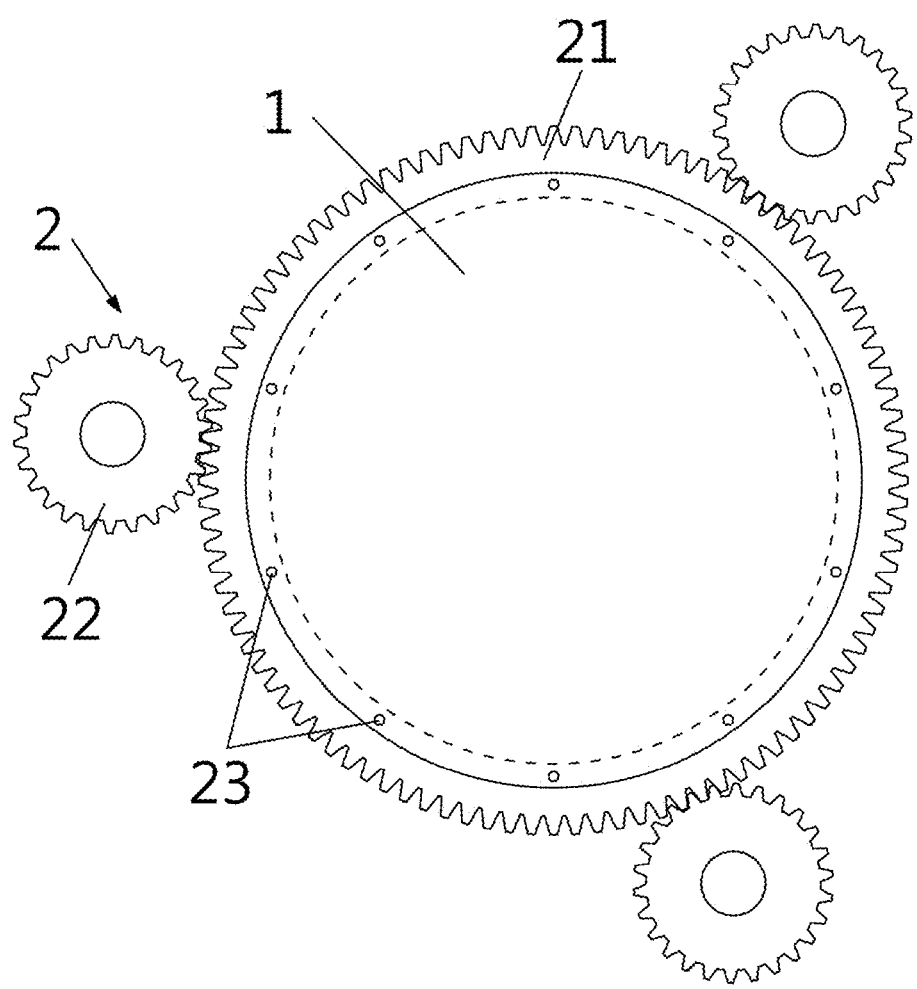
FIG. 4 is a schematic diagram of the prism rotating module according to an embodiment of the invention.

The light guide mirror assembly according to the first embodiment of the invention comprises at least two thin prisms 1 or thin prisms 1' (which are hereinafter regarded as a basic unit), a prism rotating module 2 and a Electromechanical control system and interface. In the embodiment shown in FIG. 3 and FIG. 4, the light incident surfaces 12 of the two thin prisms 1 are superimposed in the first direction T1 and arranged with predetermined spacing, inclined angle and setting. The thin prisms 1 are disposed on a base (not shown) or in an accommodation recess on the base, respectively. The bases or the accommodation recesses may be provided with one or more prism rotating modules 2, each being connected to one or more thin prisms 1. The Electromechanical control system and interface (not shown) is coupled to and controls the one or more prism rotating modules 2. The bases (as well as the basic units) are positioned to have predetermined spacing, inclined angle and setting. The relative positions among the bases may be either fixed or adjustable, with the respective bases being secured by fasteners or moveable holder modules. The moveable holder module may include but be not limited to a lifter device, a steering arm, a swinging device, a base rotating module, a telescopic slide member, a flipping/rolling device or an electroactive polymer, so long as the base and the thin prisms are secured to either have fixed spacing, inclined angle and setting, or have variable height, angle, orientation and setting. The bases are layered one after another with predetermined spacing, inclined angle and setting, such that they may be arranged in parallel, in parallel staggered relation or in variable quantities at different layers, or include a certain layer of base(s) configured in the form of a polyhedral unit, or arranged in array to constitute a polyhedral unit. The bases may even be provided with moveable holder modules to have variable spacing, inclined angle and setting. Examples of the base arrangement include but are not limited to those described above. In another embodiment, reflective mirrors or reflective lenses are disposed nearby one or more of the basic units described above with predetermined spacing, inclined angle and setting and secured by fasteners or moveable holder modules. As shown in the drawings, the prism rotating module 2 has a prism gear/pulley 21, a prism rotating member 22 and a prism power member (not shown). The prism gear/pulley 21 is arranged to surround the thin prism 1. The prism rotating member 22 is mounted on a base and engages the prism gear/pulley 21. The prism power member is connected to the Electromechanical control system and interface and coupled to the prism gear/pulley 21 or the prism rotating member 22. The prism power member is a device adapted for supplying power, examples of which include but are not limited to a servomotor, a step motor, a DC motor, an AC motor and a pneumatic compression pump (provided with a regulator valve, an air nozzle and so on). The prism rotating member 22 is a transmission device adapted for driving the prism 1 to rotate, examples of which include but are not limited to a gear, a speed change gear, a transmission case, a transmission belt, a roller and a ball. In the embodiment shown in FIG. 4, three gears are illustrated by way of example for an economic and compact layout of the prism rotating member 22. Non-limiting examples are provided as follows.

In a preferred embodiment, at least one prism gear/pulley 21 is secured to the periphery of the thin prism 1 by fasteners 23 (e.g., screws or bolts).

In another embodiment, the prism gear/pulley 21 may be formed integrally on the periphery of the thin prism 1, and the prism gear/pulley 21 may be coated with polyurea to enhance its mechanical strength.

In yet another embodiment, a universal tube extends from the prism gear/pulley 21 at a predetermined angle, wherein the universal tube has a hollow, cylindrical-shaped or partial doughnut-shaped configuration and is rotatory along with the prism gear/pulley 21. The universal tube is provided at an end thereof with an accommodation recess where a rotary module, a thin prism and other universal tube may be installed.

In yet another embodiment, a pneumatic compression pump is provided, from which an air jet is directed towards the prism gear/pulley 21 in a reverse direction through a forward nozzle or a backward nozzle under the control of a regulator valve, so that the prism gear/pulley 21 is driven to rotate.

Figure 13:
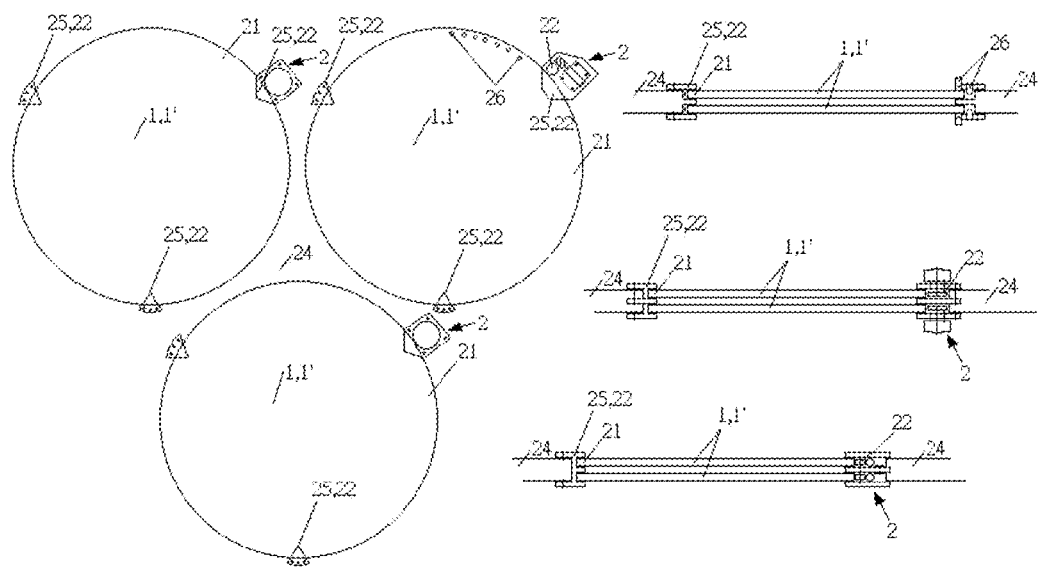
FIG. 13 is a schematic diagram of the prism rotating module according to an embodiment of the invention.

In yet another embodiment, the prism gear/pulley 21 is mounted directly at an accommodation recess on the base, where the prism gear/pulley 21 is maintained in position and allowed to rotate easily. The prism gear/pulley 21 or the accommodation recess is made of or coated with wear-resistant and low friction material, such as polytetrafluoroethylene (PTFE). The accommodation recess may be additionally provided with a securing member for preventing an accidental release of the prism gear/pulley 21, as shown in FIG. 13, the securing member 25 is provided at least three equal points, and the other examples of which include but are not limited to a thumb screw, a plate-like member, a spring or like parts capable of preventing the prism gear/pulley 21 from slipping out.

In yet another embodiment, balls are provided between the prism gear/pulley 21 and the accommodation recess on the base, and the prism gear/pulley and the accommodation recess are formed at the edges thereof with ball tracks to accommodate the balls, so that the prism gear/pulley 21 is maintained in position and allowed to rotate easily. The ball tracks are usually provided with a port through which the balls may be loaded into or unload from the ball tracks.

In yet another embodiment, the respective bases are provided with a base rotating module, which is structurally similar to and spatially close to but operationally independent of the prism rotating module. The base rotating module comprises an accommodation recess, a base rotating member (structurally similar to the prism rotating member described above), and a base rotating ring gear (structurally similar to the prism gear/pulley, or the assembled architecture of the prism gear/pulley with the universal tube). The base rotating ring gear may be coupled to the adjacent bases at the other layers directly or, alternatively, indirectly through a telescopic slide member, through a telescopic slide member and the flipping/rolling module (which is structurally similar to a terrestrial globe support or a gyroscope support), or through a swinging device (which comprises a telescopic module and a bearing).

According to the embodiments shown in the drawings, the prism gear/pulley 21 is mounted by the prism rotating member 22 in such a manner that the prism gear/pulley 21 is adapted for being driven to rotate by the prism rotating member 22 and the prism power member. The prism gear/pulley 21 may be brought in engagement with the prism rotating member 22 and the prism power member with a suitable gear ratio, or through a coaxial gear mechanism or a transmission belt, thereby achieving an enhanced movement fineness or torque. An additional securing member 25 is disposed between the prism gear/pulley 21 and the prism rotating member 22. For example, the securing member 25 may be disposed above and under either one of the prism gear/pulley 21 and the prism rotating member 22 in combination with a disc-shaped member, a ring-shaped member or a coaxial gear mechanism. The securing member 25 has a larger diameter to constitute a mechanism for securing the prism gear/pulley 21 and preventing it from accidentally falling out. The securing member 25 may be formed integrally with either the prism gear/pulley 21 or the prism rotating member 22.

Figure 5:
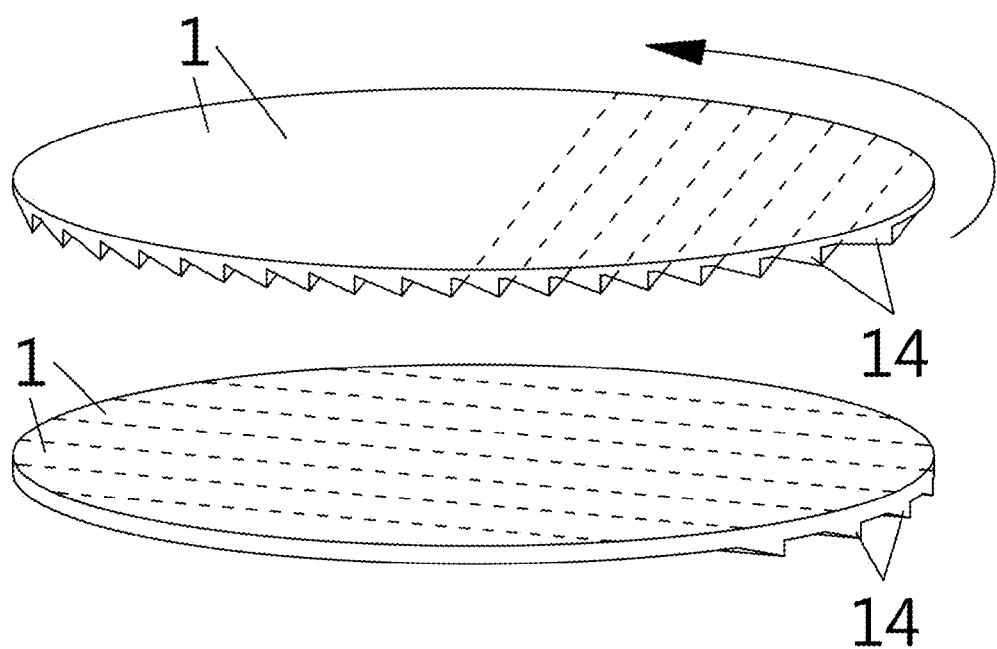
FIG. 5 is a schematic diagram, showing that the thin prisms according to an embodiment of the invention are driven to rotate.

According to the light guide mirror assembly disclosed herein, at least two thin prisms 1 are driven separately to rotate around the first direction T1 by the prism rotating module 22, as shown in FIG. 5. The triangular microstructures 14 of the individual thin prisms 1 may be reoriented through the controlled rotation of the thin prisms 1, thereby allowing superposition of the optical refraction vectors of the individual thin prisms. As such, the output paths of light may be altered and redirected towards a designated spot by adjustment of the refraction vectors, i.e., by the controlled reorientation of the upper and lower triangular microstructures 14. In the embodiments shown in the drawings, the upper and lower triangular microstructures 14 are reoriented to have an included angle of 90° by the prism rotating module. It is apparent to those skilled in the art that the individual thin prisms 1 may be rotated at any degree according to the user's demand, so as to direct the output paths of light towards a designated spot.

The Electromechanical control system and interface may be built-in with an algorithm that makes the prism rotating module 22 drive the at least two thin prisms 1 to rotate, thereby directing the output paths of light towards a designated spot. given that the initial projection vector of the current light source $\nearrow S = s \angle \theta s$ and the initial projection coordinate of the current light source $S=s[\cos \theta s, \sin \theta s]$, if the target vector $\nearrow T = t \angle \theta t$ and the target coordinate $T=t[\cos \theta t, \sin \theta t]$, then the corrected vector of the mirror assembly shall be R=T−S, and the corrected coordinate is $$[t \cos \theta t - s \cos \theta s, t \sin \theta t - s \sin \theta s] \quad (1)$$

Assuming that the prisms are numbered as $E=\{e_1, e_2, e_3, \ldots, e_n\}$ and the prisms are divided into prism group A and prism group B, in the case where the total amount of the prisms is an odd number, the last one prism is classified into prism group C, then
the corrected vector R=A+B+C,
the prism group A includes the prisms numbered $A=\{e_1, e_3, e_5, \ldots\}$,
the prism group B includes the prisms numbered $B=\{e_2, e_4, e_6, \ldots\}$,
the prism group C includes the prisms numbered $C=\{en\}$.

The prisms in the same prism groups are reoriented synchronously, while the prism in the prism group C is directed towards the corrected orientation. The relationship among the prisms is simplified as follows.
the refraction vector of prism group A $\nearrow A = a\angle \theta a = (e_1 + e_3 + e_5 + \ldots)\angle \theta a$,
the coordinate of prism group $A=(e_1+e_3+e_5+\ldots)[\cos \theta a, \sin \theta a]$,
the refraction vector of prism group B $\nearrow B = b\angle \theta_b = (e_2 + e_4 + e_6 + \ldots)\angle \theta_b$,
the coordinate of prism group $B=(e_2+e_4+e_6+\ldots)[\cos \theta_b, \sin \theta_b]$,
the refraction vector of prism group C $\nearrow C = c \angle \theta c = en \angle \theta r$,
wherein the prism group C is oriented towards the corrected orientation $\theta c = \theta r$,
the coordinate of prism group C is $e_n[\cos \theta r, \sin \theta r]$,
the corrected vector $\nearrow R = (e_1+e_3+e_5+\ldots)\angle \theta a + (e_2+e_4+e_6+\ldots)\angle \theta_b + e_n \angle \theta r$,
the corrected coordinate $$R=(e_1+e_3+e_5+\ldots)[\cos \theta a, \sin \theta a]+(e_2+e_4+e_6+\ldots)[\cos \theta_b, \sin \theta_b]+e_n[\cos \theta r, \sin \theta r] \quad (2).$$

The following embodiments are provided to illustrate the adjustment of the orientations of individual thin prisms through the Electromechanical control system and interface.

Assuming that the initial vector of sunlight $\nearrow S = 70\angle \pi 6 = 70\angle 30°$, the initial projection coordinate of the sunlight $S=70[0.866, 0.5]=[60.62, 35]$, and the mirror assembly disclosed herein includes three thin prisms with an identical configuration (designated as prism groups A, B and C, respectively), the refraction of a single thin prism is 40 unit lengths, and the target coordinate T=[−35, 42], then the adjustment of the orientations of the respective prisms to correct the refraction vector is determined by the Electromechanical control system and interface as follows.
The corrected coordinate R=T−S=[−35, 42]−[60.62, 35]=[−95.62, 7], the corrected vector $\nearrow R = 95.88 \angle 175.81°$ ... ($\theta c = \theta r = \tan^{-1} 7/−95.62 = \tan^{-1} −0.073 = 175.81°$),
$\nearrow R − \nearrow C = \nearrow A + \nearrow B$
$\rightarrow \nearrow A + \nearrow B = 95.88\angle 175.81° − 40\angle 175.81° = 55.88\angle 175.81°$
As A and B have the same unit length, then $\theta a = \theta r + \Phi,$ $\theta b = \theta r - \Phi,$ which is reduced to:

$|a\angle \theta a + a \angle \theta b| = |a\angle \Phi + a\angle -\Phi| = 2(40 \cos \theta) = 55.88$ $\rightarrow \cos \Phi = 0.6985$ $\rightarrow = \cos^{-1} 0.6985 = 45.69°$ which give the angles of the respective thin prisms:

$\theta a = 175.81° + 45.69°$ $\theta b = 175.81° - 45.69°$ $\theta c = 175.81°.$ According to the calculation above, the corrected orientation of the prism group C is 175.81°, whereas the orientations of the prism groups A and B should be offset ±45.69° from the corrected orientation (175.81°), so as to direct the output path of light towards the designated spot.

Figure 6:
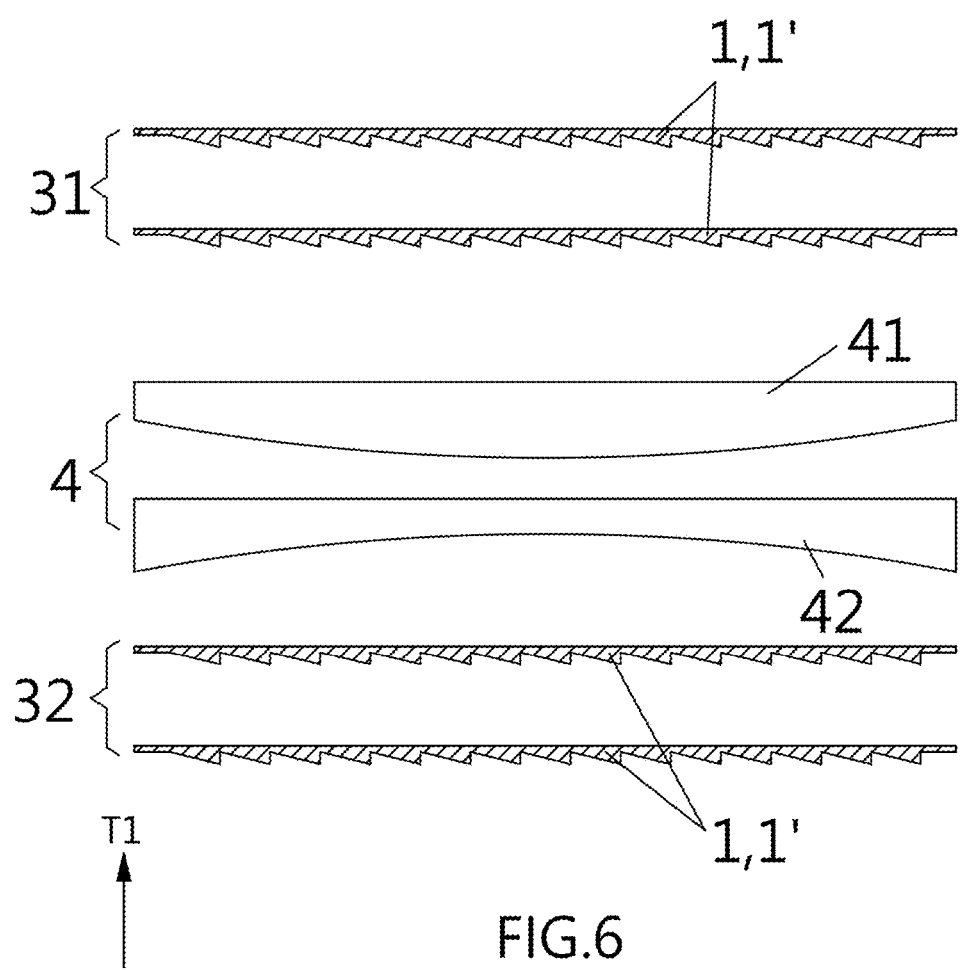
FIG. 6 is a schematic diagram of the variable-focus light guide mirror assembly according to an embodiment of the invention.

The second embodiment of the invention provides a variable-focus light guide mirror assembly, comprising at least two light guide mirror assemblies. This embodiment comprises a first and a second light guide mirror assemblies 31, 32, a variable-focus mirror assembly 4, a prism rotating module (not shown), a moveable holder module (not shown) and a Electromechanical control system and interface (not shown). The first light guide mirror assembly 31, the second light guide mirror assembly 32 and the variable-focus mirror assembly 4 may be mounted on a base (not shown), respectively. The bases may be equipped with a prism rotating module or a moveable holder module, through which they are connected to the first light guide mirror assembly 31, the second light guide mirror assembly 32 or the variable-focus mirror assembly 4. As shown in FIG. 6, the first light guide mirror assembly 31 and the second light guide mirror assembly 32 include at least two thin prisms 1, 1', respectively.

In the second embodiment, the prism rotating module 2 is coupled to the respective thin prisms of the first and the second light guide mirror assemblies 31, 32 shown in FIG. 6, so as to allow the controlled rotation of the two thin prisms 1, 1' around the first direction T1. The prism rotating module 2 according to the second embodiment is structurally substantially identical to that described in the first embodiment.

The variable-focus mirror assembly 4 is disposed between the first light guide mirror assembly 31 and the second light guide mirror assembly 32, and includes at least one convex lens 41 and/or at least one concave lens 42 superimposed in the first direction T1. The moveable holder module (not shown) is connected to the variable-focus mirror assembly 4, the first light guide mirror assembly 31 or the second light guide mirror assembly 32, so that the spacing between the convex lens 41 and the concave lens 42 or between the at least two thin prisms (in this case, variable-focus thin prisms) can be adjusted. The Electromechanical control system and interface (not shown) is connected to the prism rotating module 2 and the moveable holder module, so as to govern the operation of the prism rotating module 2 and the moveable holder module, thereby controlling the rotation of the individual thin prisms, adjusting the refraction vector, and changing the spacing between the convex lens 41 and the concave lens 42 or between the at least two thin prisms (in this case, variable-focus thin prisms) to adjust the focal length. It is apparent to those skilled in the art that the variable-focus mirror assembly in this embodiment may be partially or entirely substituted with variable-focus thin prisms. The convex lens 41 or the concave lens 42 may be selected from a Fresnel lens to reduce the lens thickness and weight.

The variable-focus light guide mirror assembly suitable for use in the second embodiment may be classified into a split type and a composite type. In the case of the split-type variable-focus light guide mirror assembly, the first and the second light guide mirror assemblies used therein are of the same thin prism configuration as that disclosed in the first embodiment. The respective thin prisms of the first light guide mirror assembly are managed by the prism rotating module to project light in a vertical direction onto the variable-focus mirror assembly. With the adjustment by the moveable holder module, the light beam received by the variable-focus mirror assembly is focused onto or converged towards the second light guide mirror assembly. Afterwards, the respective thin prisms of the second light guide mirror assembly are driven to direct the light beam towards the designated spot under the control of the prism rotating module.

Alternatively, the composite-type variable-focus light guide mirror assembly comprises a first mirror light guide assembly and a second light guide mirror assembly, each having at least two thin prisms, provided that at least one of the thin prisms is a variable-focus thin prism, and that the first light guide mirror assembly comprises at least one focusable thin prism and the second light guide mirror assembly comprises at least one virtual focus thin prism. The focusable thin prism(s) of the first light guide mirror assembly is/are managed by the prism rotating module to project a focused light onto the variable-focus mirror assembly. With the adjustment by the moveable holder module, the light beam received by the variable-focus mirror assembly is focused onto or converged towards the second light guide mirror assembly. Afterwards, the virtual focus thin prism(s) of the second light guide mirror assembly is/are driven to direct the received light beam towards the designated spot under the control of the prism rotating module and the moveable holder module.

Moreover, the variable-focus mirror assembly may be removed from the composite-type variable-focus light guide mirror assembly and, in this case, the composite-type variable-focus light guide mirror assembly consists essentially of the first light guide mirror assembly, the second light guide mirror assembly, the prism rotating module, the moveable holder module and the Electromechanical control system and interface. The first light guide mirror assembly comprises at least one focusable thin prism, and the second light guide mirror assembly, so that the first light guide mirror assembly and the second light guide mirror assembly can perform a focus-varying function. The focusable thin prism(s) of the first light guide mirror assembly is/are managed by the prism rotating module to project a focused light onto the second light guide mirror assembly. Afterwards, the virtual focus thin prism(s) of the second light guide mirror assembly is/are driven to further focus the received light beam onto or converge the received light beam towards the designated spot under the control of the prism rotating module and the moveable holder module.

Figure 8:
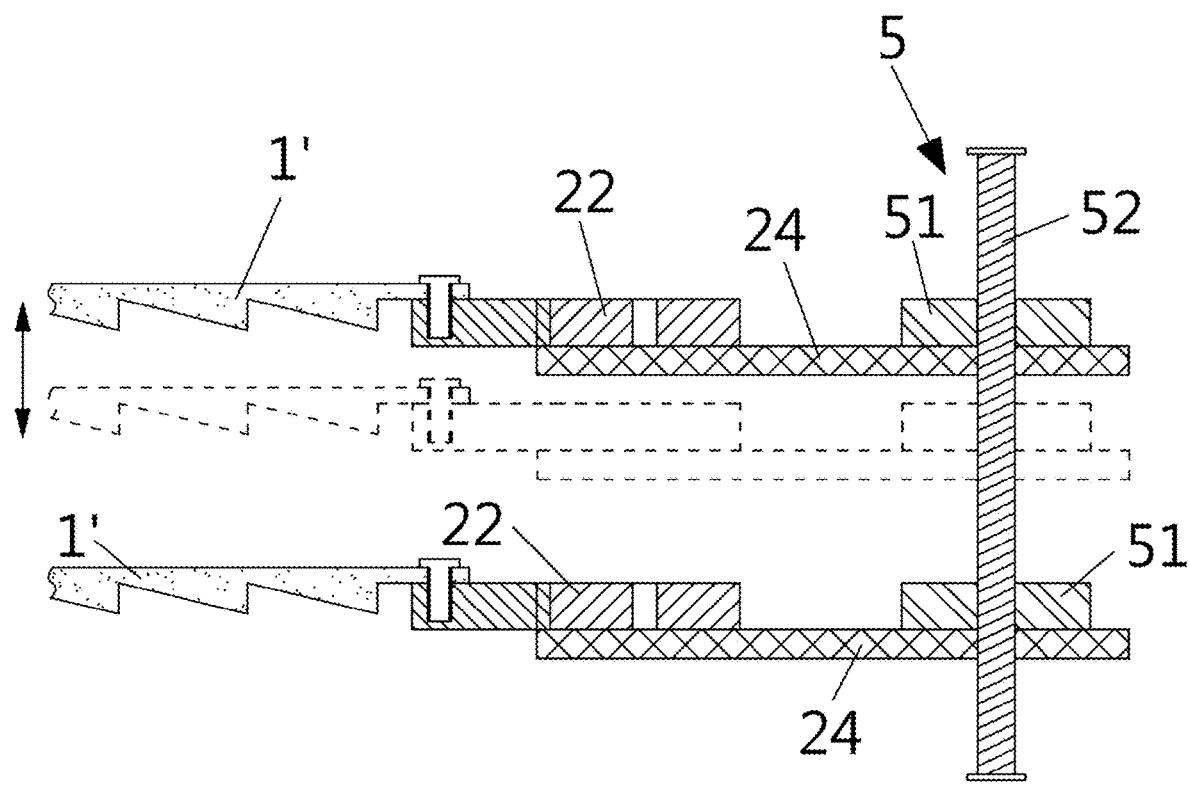
FIG. 8 is a schematic diagram of the moveable holder module according to an embodiment of the invention.
Figure 10:
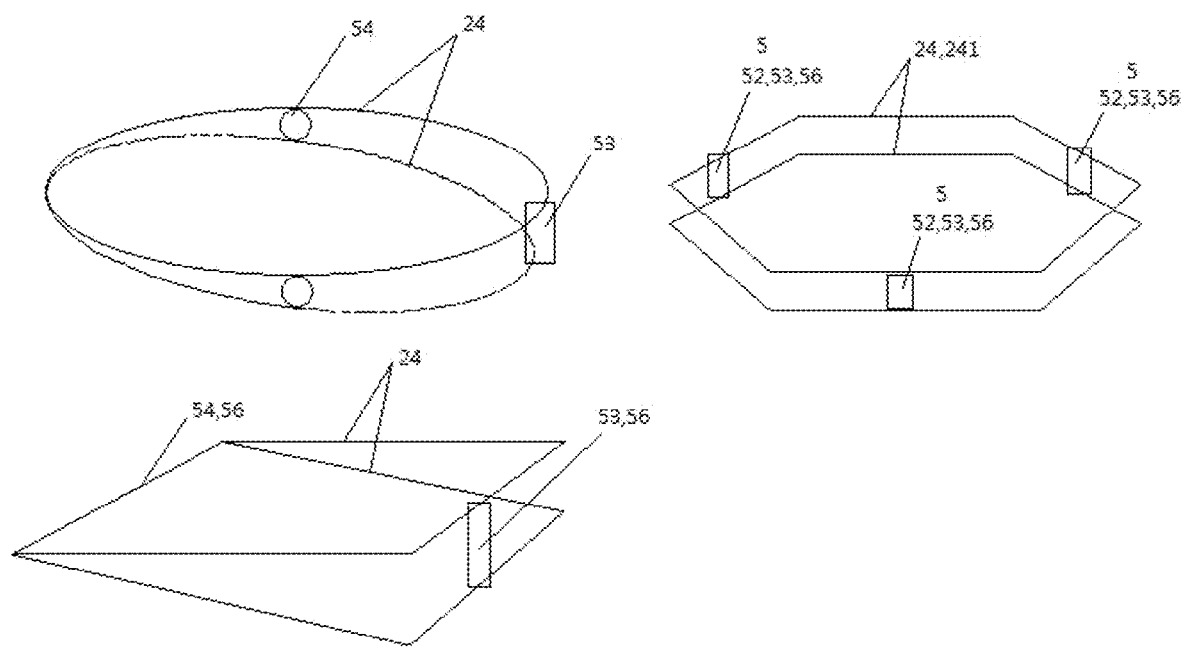
FIG. 10 are schematic diagrams showing the structural arrangements of the moveable holder module according to the invention.
Figure 12:
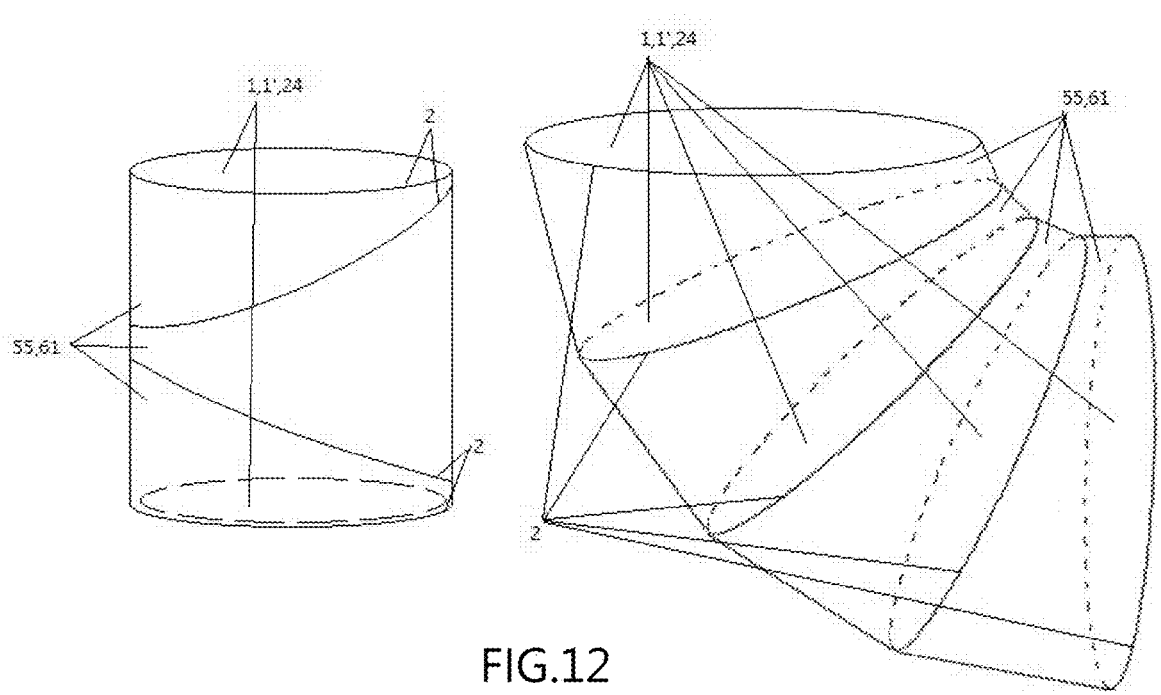
FIG. 12 is a schematic diagram of the universal tube according to an embodiment of the invention.

As shown in FIGS. 8, 10 and 12, the bases 24 are either fixed or operably adjustable in terms of the spacing among them, inclined angle and setting by base fasteners or a moveable holder module 5. In the case where the moveable holder module 5 is configured in the form of a lifter device, it comprises a base gear 51, a lifter screw 52, a base motor (not shown) and a base transmission member (not shown). The base gear 51 is mounted circumferentially on the base 24, and the base 24 is adapted for being mounted with a variable-focus thin prism, a convex lens or a concave lens. In the embodiment shown in the drawings, the base 24 is illustrated by way of example to be mounted with a variable-focus thin prism F. The base gear 51 is sleeved on and engaged with the lifter screw 52. The base transmission member is disposed on the base 24 and engaged with the base gear 51. The base motor is connected to the base transmission member and the Electromechanical control system and interface, respectively. The base gear 51 is driven to rotate by the base motor through the base transmission member and move upwardly or downwardly along the lifter screw 52, thereby driving the base 24 to move upwardly and downwardly and adjusting the spacings among or the heights of the variable-focus thin prisms 1', the convex lens and the concave lens. In another embodiment, the bases 24 are fixed by base fasteners 56, and the base fasteners 56 are adapted for a slight angle compensation with temperature change, as different materials have different thermal expansion coefficients. In another embodiment, the bases 24 are either fixed or operably adjustable in terms of the spacing among them, inclined angle and setting by at least one telescopic module 53, bearing 54, a universal tube 55, a base rotating module, a telescopic slide member or flipping/rolling module. In yet another embodiment, the bases 24 are either fixed or operably adjustable in terms of the spacing among them, inclined angle and setting by a base rotating module, a telescopic slide member or a flipping/rolling module. The bases may be provided with a base rotating module, which is spatially close to but operationally independent of the prism rotating module. The base rotating module comprises an accommodation recess, a base rotating member (structurally similar to the prism rotating member described above), and a base rotating ring gear (structurally similar to the prism gear/pulley, or the assembled architecture of the prism gear/pulley with the universal tube). The base rotating ring gear may be coupled to the adjacent bases at the other layers directly or, alternatively, indirectly through a telescopic slide member, through a telescopic slide member and the flipping/rolling module (which is structurally similar to a terrestrial globe support or a gyroscope support), or through a swinging device (which comprises a telescopic module and a bearing). Non-limiting examples above are provided for illustration purposes only, and other examples may be applicable in the invention, so long as they are adapted to facilitate the light guide efficiency of the mirror assembly disclosed herein.

The light guide mirror assembly or the variable-focus light guide mirror assembly described in the embodiments above may be further provided with an optical path sensor disposed next to any one of the thin prisms, such as in front of or behind any one of the thin prisms, and adapted for detecting light projection from the first light guide mirror assembly, as well as the refraction vector and the beam convergence of the final output. The optical path sensor is connected to the Electromechanical control system and interface, and it is an accessory part combined with or without one of the prisms. All of the photosensors in the optical path sensor are adapted for detecting light beams projected along the same direction or, alternatively, some of them are adapted for detecting light beams projected along different directions. The optical path sensor is useful in ensuring that the output light beam is projected and converged towards the designated spot, while the output can be adjusted to follow the designated target or path. The optical path sensor functions to obtain the coordinates of a light beam passing through the sensor plane. It is configured to include one or more photosensors as a basic unit, which are arranged in rows or in an array. Preferably, the photosensors are configured in the form of a transparent substrate printed or coated with a circuit layout with transparent or extremely fine traces. In the case where the photosensors are aligned in rows, they may be either arranged into a special pattern, such as a grid, a web, a ring, or a radial pattern, or alternatively constructed to be moveable reciprocally to carry out a scanning detection, so that the detection by these photosensors can fully cover the plane coordinates. In the case where the photosensors are arranged in an array, they are classified into those adapted for power supply scanning (with fewer signal lines) and those provided with exclusive signal lines, so that the detection by the photosensors can fully cover the plane coordinates. Each basic unit may include a single type of photosensors which are adapted for detecting light beams projected along the same direction, or each basic unit may include multiple types of photosensors adapted for detecting light beams projected along different directions (the information regarding the traveling paths of light beams on the coordinates can be directly derived from power difference). Alternatively, the types of photosensors are distributed depending upon the regions they located. Another method for acquiring the information regarding the output paths and beam convergence of light beams is to record the differences detected on the coordinates and track the change in traveling paths of the light beams by multiple optical path sensors mounted in the mirror assembly or by a single optical path sensor moving back and forth. The optical path sensor(s) may be independently disposed in front of, behind, between or onto the prisms. In the case where the prisms are rotatable, electrical brushes or wireless transmission modules may be further provided for power and data transmission. Alternatively, the light guide mirror assembly or the variable-focus light guide mirror assembly described above may be further provided with a camera and programmed to perform computer vision/image recognition technology, so as to track whether the output light beam is directed onto the target, thereby facilitating output correction and keeping up the designated target or path. Still alternatively, techniques for detecting the prism orientation may be used, wherein, as shown in FIG. 13, the basic orientation detection means, such as the single-track raster codes, is mounted circumferentially around the prisms, and multiple optical transmittance detectors 26 are provided to acquire the orientation information presented by raster distribution. The hardware azimuth resolution may be further enhanced by increasing the raster density, by increasing the quantity of the optical transmittance detectors and by using small radius gears to increase micro-motion feedback. Other advanced techniques for orientation detection may be implemented in combination with software timing, software step counting and transmittance analog signals micro-motion interpretation.

The optical path sensor described above may be a planar array optical path sensor. The sensor may comprise a transparent substrate coated in sequence with a layer of transparent electrodes, an array of transparent photosensitive devices and a layer of transparent signal lines. The signal lines are electrically connected to the photosensitive devices. The photosensitive devices may be photoresistors or optoelectronic components adapted to change electric resistance or current upon receiving light, which may help the Electromechanical control system and interface sense the illumination on the coordinates, so as to see if the refraction vector and the beam convergence of the mirror assemblies meet the needs.

The optical path sensor described above may be a scanning-type optical path sensor. The sensor may comprise a transparent substrate coated in sequence with a layer of longitudinally aligned transparent electrodes, an array of transparent photosensitive devices and a layer of traversally aligned transparent signal lines. The traversally signal lines are electrically connected to the photosensitive devices. The photosensitive devices may be photoresistors or optoelectronic components adapted to change electric resistance or current upon receiving light, which may help the Electromechanical control system and interface sense the illumination on the coordinates, so as to see if the refraction vector and the beam convergence of the mirror assemblies meet the needs.

The optical path sensor described above may be shaped into a strip configuration, on which transparent photosensitive elements or miniatured photosensitive elements are aligned to constitute a transparent or superfine strip-like optical path sensor. Preferably, multiple strip-shaped optical path sensor are arranged in a radial pattern or a ring pattern, thereby helping the Electromechanical control system and interface check if the refraction vector and the beam convergence of the mirror assemblies meet the needs.

The optical path sensor described above may be a mechanical scanning-type optical path sensor configured in the form of a transparent or superfine rod, on which photosensitive elements are aligned in a row. The optical path sensor can be mechanically driven to either rotate in a circle or at a limited angle, or slide reciprocally right and left (or back and forth), helping the Electromechanical control system and interface sense the illumination on the coordinates, so as to see if the refraction vector and the beam convergence of the mirror assemblies meet the needs.

The mirror assemblies disclosed herein (including the light guide mirror assembly and the variable-focus light guide mirror assembly) may be installed as follows.

1. Flat Weatherproof Sealing Structure and Polyhedral Architecture

Figure 11:
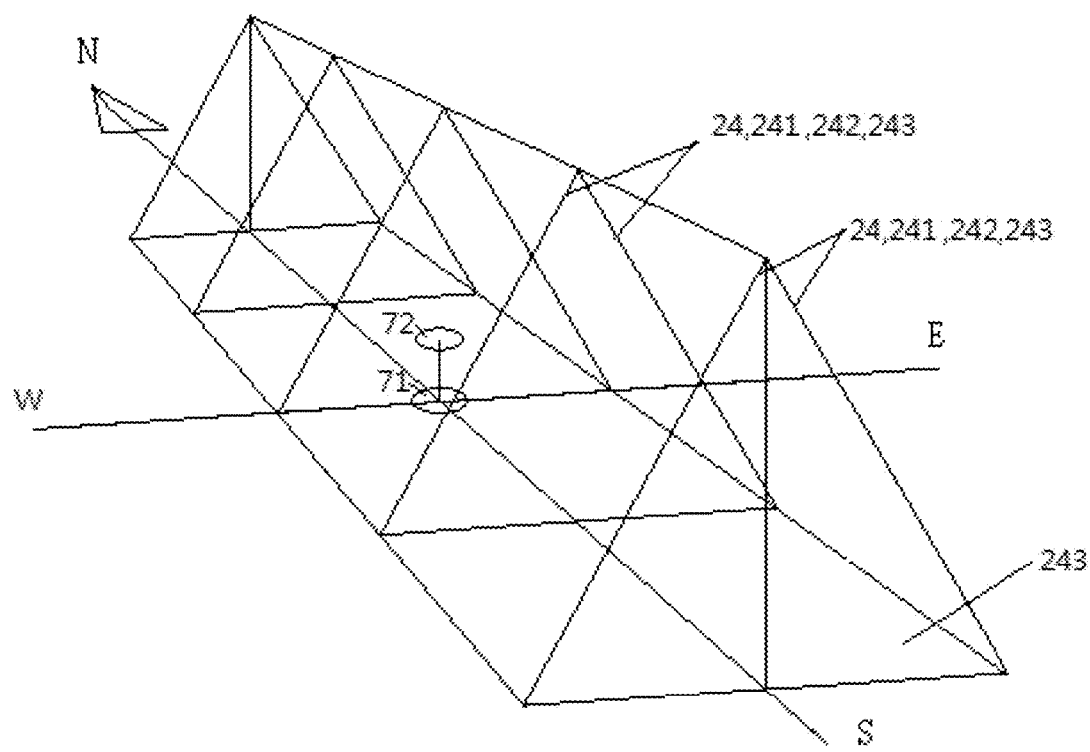
FIG. 11 is a schematic diagram of the polyhedral architecture according to an embodiment of the invention.

As shown in FIG. 10 and FIG. 11, the mirror assembly disclosed herein may be installed alone or in array on a flat weatherproof sealing structure 241, which may in turn be mounted on a conventional roof 243. The flat weatherproof sealing structure 241 may be shaped to have a planar, a bell-like, a spheric and a curved surface. The flat weatherproof sealing structure 241 may be directly mounted on, replace or constitute the roof 243, or installed on a static platform (plane) built on a high place. A plurality of the flat weatherproof sealing structures 241 may also be fabricated into a polyhedral architecture 242, which are advantageously adapted for receiving more light as compared with a single piece of a planar-shaped flat weatherproof sealing structure 241. The polyhedral architecture 242 includes but is not limited to a trihedral architecture 242 composed of two pieces of the planar-shaped flat weatherproof sealing structures in combination with the ground surface or an additional piece of the planar-shaped flat weatherproof sealing structure; and a tetrahedral architecture 242 composed of three pieces of the planar-shaped flat weatherproof sealing structures in combination with the ground surface or an additional piece of the planar-shaped flat weatherproof sealing structure. The flat weatherproof sealing structure 241 is fabricated by assembling and enclosing multiple layers of the transparent bases 24, wherein the bases 24 are arranged with predetermined spacing, inclined angle and setting. For example, the bases 24 may be arranged in parallel, in parallel staggered relation, in staggered relation after a position change, or in variable quantities or sizes at different layers, or include a certain layer of base(s) configured in the form of a polyhedral unit, or arranged in array to constitute a polyhedral unit. The bases 24 may be provided with moveable holder modules to have variable spacing, inclined angle and setting. Examples of the base arrangement include but are not limited to those described above. Within an effective range, individual mirror assemblies may direct output light beams towards any designated spot(s). The mirror assemblies may be designated into groups and demanded to direct output light beams towards one or more target positions. The more the output light beams are directed to a certain target position, the higher the intensity of energy is received by the certain target position. The target position, to which the converged light beams are directed, may be changed from one to another depending on the needs.

2. Dynamic Steering Tracking Platform

The mirror assembly disclosed herein may be installed, alone or in array, on a dynamic steering tracking platform or a steering arm which is provided with a light source vector sensor. The light source vector sensor, the dynamic steering tracking platform or the steering arm is electrically connected to the Electromechanical control system and interface, so that the Electromechanical control system and interface can reorient the dynamic steering tracking platform or the steering arm to be substantially perpendicular to the sunshine or the beam traveling direction, so as to achieve the maximum surface area for receiving the sunlight and acquire the maximum power or to be oriented towards other light sources. The steering arm comprises a horizontal rotating module and a pitch angle lifting/rotary module. Another swinging installation is to mount at least one swinging device, such as a telescopic module, a bearing or a universal tube, within a basic unit or between two bases of the basic unit, or between a light guide mirror assembly and a base, or between two light guide mirror assemblies. The telescopic module may include, but be not limited to, a hydraulic member, a pneumatic member, a gear, a lever, an axle and a piezoelectric component, so long as it could serve as a dynamic steering tracking platform herein and amplify the rotation angle of the mirror assembly. Under the premises that the irradiation direction and position ranges are wide, and that the beam convergence and intensity, as well as the designated spot where the beams are converged, are adjustable, the overall system can be oriented towards any direction with the steering platform. Accordingly, the highly versatile system herein can be oriented towards the light source at any time to maintain the maximum light receiving area and has an adjustable pose to optimize the workable angle range of the output beam.

3. Hover Vehicle or Platform

The mirror assembly herein may be installed, alone or in array, on a hover (space-based) vehicle, such as an aerostat platform (e.g., a hot-air balloon), a mechanical air-staying platform (e.g., a Dyson sphere and a space elevator), an orbital platform (e.g., a satellite and a space station), a powered hover platform (e.g., a drone). Under the premises that the irradiation direction and position ranges are wide, and that the beam convergence and intensity, as well as the designated spot where the beams are converged, are adjustable, the overall system is highly mobile to go to almost any location along with the vehicle/platform. It is applicable to outdoor climatic control, locust control, reconnaissance, telecommunication and geotechnical engineering.

The mirror assemblies disclosed herein (including the light guide mirror assembly disclosed in the first embodiment and the variable-focus light guide mirror assembly disclosed in the second embodiment) are useful in the following applications.

1. Applications in General Open Spaces

Multiple mirror assemblies may be installed on a roof of a factory building along with an array of the stably mounted mirror assemblies described above, thereby providing illumination on the designated aisles or working spaces in an open factory building. For the regions where illumination cannot be provided directly, an additional mirror assembly or mirror surface may be mounted at the turns if necessary, so that light can be readily reflected to the target regions. Alternatively, light beam may be accurately projected onto arrays of crops planted in a farm or a vertical farm. Still alternatively, light energy may be concentrated in a heat storage device for thermal storage and heat transfer to perform photo-thermal power generation, heat evaporation (seawater or wastewater desalination by distillation), thermal smelting, thermal reaction, thermal cracking, thermal incineration, supplying hot water and regulating room temperature; or concentrated on a photovoltaic panel, e.g., a GaAs photovoltaic panel for power generation. Still alternatively, light energy is concentrated and heated in a solar chimney for discharging hot air from the room, air convection, air cleaning and hot gas flow power generation. The light beam and energy distribution may be adjusted at various sites for different applications. The light beam may be converged towards or rendered to dynamically track one or more static or moving targets. The array of the multiple mirror assemblies may distribute light energy in a cooperative manner. That is to say, the light energy of output beam may be distributed to multiple locations in the space, wherein the space refers to an arbitrary coordinate position in the three-dimensional space. After the required intensity, position and quantity are determined, multiple mirror assemblies are divided into several groups according to the numbers of the required positions, and the numbers of the members in the respective groups may be adjusted according to the required intensity. The respective groups of the mirror assemblies converge the light towards the required locations, and these locations may be adjusted freely.

3. Application of Light Pipes as Illumination on Light-Shielded Space and Specific Location A plurality of mirror assemblies may be installed in array on a roof together with the static architecture described above. A plurality of light pipes, e.g., macro-optical fibers or total internal reflection metal lines, are provided, whose light receiving ends are arranged nearby the array of the mirror assemblies to receive light from the mirror assemblies. The terminal ends of the light pipes may be arranged in communication with several light-shielded spaces. Based upon the illumination requirements of the respective light-shielded spaces, a proper amount of the mirror assemblies are arranged to direct the output light beams to the light pipes, thereby transmitting light energy to the designated light-shielded spaces. The respective light pipes may be provided at the terminal ends thereof with an adjustable reflective mirror, an optical diffuser or a light scatterer, thereby projecting light to the designated spots or evenly distributing light in the designated spaces. Alternatively, the light pipes may be provided to evenly distribute light energy to arrays of crops planted in a vertical farm. An array of the mirror assemblies are arranged to distribute light energy in a cooperative manner, and share the light receiving ends of the light pipes. Any one of the mirror assemblies may be freely paired with any one of the light pipes. The light receiving ends are usually arranged in intensive array around the array of mirror assemblies, allowing the mirror assemblies to emit light to the light pipes. The light pipes are arranged in optical communicate with the light-shielded spaces (namely, the spaces spatially shielded from the output light of the mirror assemblies). Likewise, the respective light-shielded spaces are provided with adequate amounts of the mirror assemblies in combination with adequate amounts of the light pipes according to the required illumination intensity. Unlike the peripheral light receiving array, an open area without light receiving array can be kept in the middle, the array of multiple mirror assemblies still can converge light beam in any required position in the open space (the spatial limit irradiated directly by the array of multiple mirror assemblies). The finer the light pipe is, and the smaller space is occupied, the mirror assembly with contracted beam or focusable light beam is more required, so that the light can be received accurately.

3. Weather Control

Multiple mirror assemblies can be installed with said mirror assembly array installed on air-staying platform, the differences in illumination density and temperature are arranged in the space by using the array of multiple mirror assemblies, generating high pressure and low pressure, the wind direction can be arranged and the convection can be accelerated, and the water vapor is carried with the wind, the water vapor is concentrated at low pressure to form clouds and rain or the water vapor is dispersed and carried away at high pressure. When the focusing position is in the middle aerial domain, the temperature rises gradually in the middle aerial domain, and the ground remains cool; the air temperature rises in the middle aerial domain, forming low pressure, the hot air flows up, which is supplemented by nearby cool air, the water vapor is supplemented and accumulated continuously, the accumulated water vapor is helpful to ground cooling and rain, so as to recover the agricultural and forest ecology and water resources in desert area and drought period. As the luminous range is longer, especially longer transmission distance of infrared band, and after the focusing in the middle aerial domain, the ground consumption is converted into heat energy and kinetic energy, staying in the middle aerial domain, the comfortable temperature of ground remains. On the contrary, when the illumination and temperature in the designated aerial domain are reduced continuously, high pressure is formed, carrying the water vapor away from the regions of rainstorm and hurricane, so as to stop the rain or weaken the hurricane scale, the weather is controlled. The weather control helps desert and frozen soil greening, the $CO_2$ absorption is accelerated by agricultural and forest ecology, so as to eliminate the negative influence of carbon emission.

4. Fire Extinguishment

When a mountain forest fire occurs, the sunlight source in the fire scene can be moved to a safety zone nearby, it is helpful to lowering the fire scene temperature; focusing in the middle aerial domain of peripheral safety zone to form a competitive low pressure wall, suppressing the convection between the fire scene and the outside to obtain oxygen, the fire scene oxygen concentration is reduced. The generated wide range of low pressure contributes to accelerating the accumulation of water vapor to form clouds and rain, further preventing the fire from spreading and assisting in extinguishment. Installing the mirror assembly array on an air-staying platform is preferred.

5. Locust Control

The locusts take more crops to make up the water loss in high-temperature dry weather, resulting in economic losses of insect damage and agricultural and forest ecology. The cooling and rain can reduce the excessive feeding of locusts. Secondly, under the phototactic effect of insects, the locusts tend to fly to the focus in the middle aerial domain, a part of pests can be killed by the high temperature at the focus. Installing the mirror assembly array in the air is preferred.

6. Transmission Mirror Assembly for Light Transmission

Figure 9:
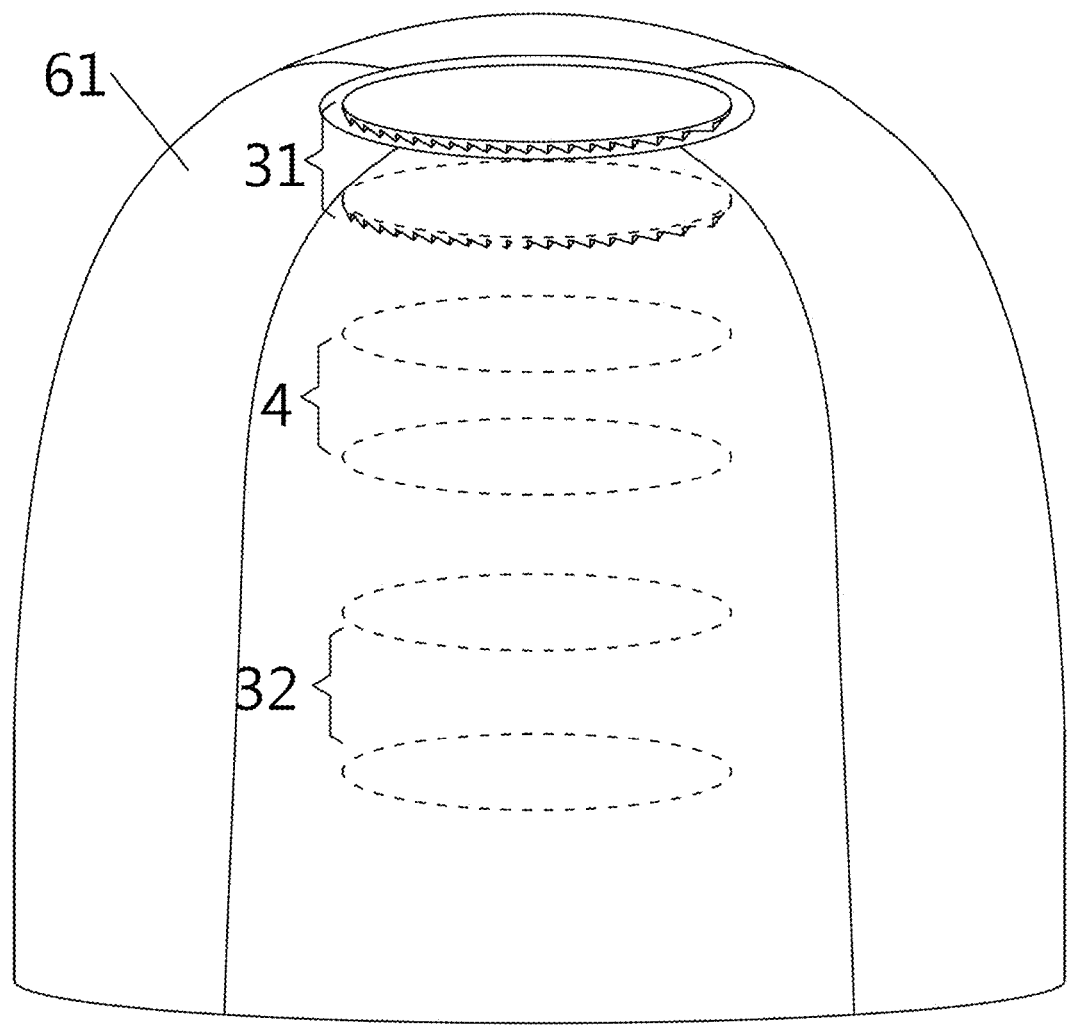
FIG. 9 is a schematic diagram of the light transmission mirror assembly according to an embodiment of the invention.

The idea herein is to perform long-distance transmission of energy and information by using a transmission mirror assembly to transfer highly directional light beams. Relay transmission may also be performed by the transmission mirror assembly, thereby increasing the overall transmission distance. Specifically, the transmission may be originated from a remote front end (an upper end) and reach a remote rear end (a lower end) through a domestic device (the local end), and so on. In the upper end, the light beam scans in the space to look for the position of the domestic device (the local end). When the light beam reaches the reflection casing of the local end, the position of the local end is revealed automatically due to reflection of the light beam. Then, the local end communicates with upper end through the reflected light, so as to transfer the corrected information regarding the fine-tuning of the light beam orientation and beam convergence, as well as the rear end energy demand, the identity, the access permission and other information. These information in the form of light beams can be readily received by common photosensors. The signal reflection casing is designed to reveal the orientation and position of the domestic mirror assembly to a similar mirror assembly at the front end, as a means to search, track and maintain the directional communication. A first signal loading module is provided to use output beams as a main carrier, which may be loaded with any man-made data content with designated significance (including machine-generated signals). Typical means includes creating pulse, frequency, intensity, phase and polarized signal changes, and loading the created signals in the light beam. The man-made data signals (including machine-generated signals) are sent to another remote equipment at the lower end (e.g., a similar mirror assembly for light transmission) and received by a sensor. The artificial data content is obtained, so as to implement long-distance wireless (directional) communication of man-made data signals. The man-made data are transferred through the Electromechanical control system and interface to the first signal loading module, and then the output beam carrying the man-made data are transmitted to other remote equipment. The second signal loading module is provided to upload man-made information for any purpose (including machine-generated signals) to the light beam reflected automatically by the reflection casing at the local end, in response to the failure of another remote device at the upper end (e.g., a similar mirror assembly for light transmission) to register an incident beam with the light beam outlet/inlet at the local end, so as to communicate with the upper end. This transmission mirror assembly mainly employs the variable-focus light guide mirror assembly according to the second embodiment. The transmission mirror assembly may be mounted downstream of an array of the light guide mirror assemblies or an array of the variable-focus mirror assemblies to concentrate light beam, or arranged in series for relay transmission. The mirror assembly may be further provided with a signal reflection casing, a first signal loading module and a second signal loading module. As shown in FIG. 9 and FIG. 12, the signal reflection casing 61 is disposed to surround the first light guide mirror assembly 31, the second light guide mirror assembly 32 and the variable-focus mirror assembly 4. According to the embodiment shown in the drawings, the signal reflection casing 61 is configured in the form of a bell-shaped cover surrounding the first light guide mirror assembly 31, the second light guide mirror assembly 32 and the variable-focus mirror assembly 4. The light beam outlet/inlet is formed at the front end and the rear end of the signal reflection casing 61. The signal reflection casing 61 may be fabricated in various configurations, so long as it does not block the light beam outlet/inlet. Preferably, the mirror assemblies are mounted close to the light beam outlet/inlet. Feasible configurations include but are not limited to a spheric, a wheel-shaped, a disc-like, a capsule, an egg-shaped, a bullet-like and a bell-shaped configuration. Alternatively, the signal reflection casing 61 is fabricated in a universal tube 56. The outer surface of the signal reflection casing 61 is a mirror-like smooth surface or, alternatively, the outer surface is further provided with isosceles right-angled triangular reflective microstructures or a convex lens. The first signal loading module (not shown) is disposed on behind the second light guide mirror assembly and the optical path sensor. The second signal loading module (not shown) is disposed on the outer layer or the front side of the signal reflection interface. The first and second signal loading modules are independently selected from the group consisting of a liquid crystal module, a piezoelectric module, an electrically controlled polarization module, an electroactive polymer, laser communication technology, wireless communication technology or wire communication technology. The signal is transferred from the electromechanical device, the bright and dark pulses, filtering or dispersion focal length drift change color frequency, by drifting and changing the lighting position, convergence and distribution and changing the polarized light, the output beam loads man-made data signal, which is sent to long-distance other communication device as lower end through the beam, and the signal is analyzed to complete communication.

This light transmission mirror assembly herein may be installed in the same ways described above. For example, the signal reflection casing 61 may be mounted on a fixture base, a support frame, a steering platform or a steering arm. Alternatively, a light source vector sensor is installed on the signal reflection casing 61, and the light source vector sensor and the steering platform or the steering arm are electrically connected to the Electromechanical control system and interface, so as to detect the orientation of the light beam and direct the light transmission mirror assembly towards the light source. The light transmission mirror assembly herein is useful in cutting large objects, such as rocks, buildings and tunnels, reforming landscape, heating sandstone into molten lava which is cast-molded for construction use, directional beam communication, light beam probing and light beam energy transmission.

7. Dispersion Applications

There will be dispersion effect when the light is refracted, the frequency below infrared ray (hereinafter referred to as heat energy) has smaller refraction angle, the frequency above visible light and UV (hereinafter referred to as light energy) has larger refraction angle. When the light is focused, the dispersion phenomenon results in longer focal length of heat energy and shorter focal length of light energy. The heat energy has more apparent thermal effect, the light energy is stronger, the heat energy is centralized in photo-thermal (power generation/heating) devices, e.g., turbine generator or thermoelectric module, or to regulate room temperature and heat solar chimney to dissipate heat. The light energy is used for photovoltaic power generation, e.g., GaAs photovoltaic module, or for crop photosynthesis. The dispersion is used for light splitting, the foci of light energy and heat energy are separated in different positions, the light pipe can be placed at the light energy or heat energy focus, the correct frequency is accurately distributed to the designated spot, or sent to an arbitrary designated spot at distance through the transmission mirror assembly, or a few devices (area/cost) are placed at the light energy or heat energy focus respectively, preventing the interference and waste of idling frequency misplacement, e.g. avoiding the photovoltaic power generation panel temperature rise disturbing frequency and life, and the heat energy can be fully used, the light and heat are separated in space, and the power generation system specializes in using light energy and heat energy, when the light energy and heat energy are converted effectively and simultaneously, the energy efficiency can be increased twice. As shown in FIG. 11, in one embodiment, an array of the light guide mirror assemblies or the variable-focus light guide mirror assemblies herein project the sunlight on a photovoltaic power installation 72 and photo-thermal (power generation/application) device 71 or the light receiving ends of the light pipes described above. In another embodiment, an array of focusable thin prisms or the light guide mirror assemblies or the variable-focus light guide mirror assemblies are installed on a dynamic tracking platform, the heat energy and light energy are separated by dispersion, and individually directed by a plurality of light pipes toward the photovoltaic power installation and photo-thermal (power generation/application) device for effective application.

8. Projection Visualization Applications

The movement, drift, color change and imaging of light beam can build different atmospheres and interaction effect. When the light beam array images the projection, each light beam or pixel light spot can be filtered by optical reel, and the color of projection light spot can be changed by changing the focal length as the red light and blue light have different focal lengths under the dispersion effect, so as to convey abundant interactive information and pictures by projection imaging. The projection screen can be an artificial wall, a curtain, a floor or outdoor clouds and outdoor ground.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

I claim:

1. A light guide mirror assembly, comprising:
at least two thin prisms designated as a basic unit, superimposed in a first direction and arranged with predetermined spacing, inclined angle, and position, each of the thin prisms having a bottom surface formed with a plurality of triangular microstructures extending in parallel following predetermined routes and directions, a light incident surface opposite to the bottom surface and a side face, wherein each of the triangular microstructures comprises a vertical face substantially perpendicular to the bottom surface and an inclined face at an acute angle smaller than 90° with respect to the bottom surface, and wherein the at least two thin prisms are designated as a basic unit and the light incident surfaces are oriented towards the same side with respect to the first direction and arranged with predetermined spacing, inclined angle, and position;
the light guide mirror assembly comprising one or more basic units arranged with predetermined spacing, inclined angle and position, and including but not limited in the staggered relation, in variable quantities at different layers;
wherein, at least one piece of the thin prism is a focusable thin prism, or, at least one piece of the thin prism is a virtual focus thin prism, or, some of the thin prisms is a no-focus thin prism;
one or more bases or universal tubes, wherein the at least two thin prisms are resided at a position selected from the group consisting of the one or more bases, accommodation recesses on the one or more bases, the one or more universal tubes, and accommodation recesses in the one or more universal tubes;
at least one prism rotating module mounted at a position selected from the group consisting of the one or more bases, an accommodation recess on the one or more bases, the one or more universal tubes and an accommodation recess in the one or more universal tubes, and each of the prism rotating module connected to at least one of the thin prisms, so that the thin prisms is adapted for being driven to rotate around the first direction or a direction at the inclined angle;
wherein the one or more bases are secured by a base fastener or a moveable holder module, so that one or more bases are secured to either have fixed spacing, inclined angle and position, or have variable height, angle, orientation or position, and wherein the moveable holder module includes but not limited to a lifter device, a steering arm, a swinging device, a base rotating module, a telescopic slide member or a flipping/rolling device, an electroactive polymer; and
an Electromechanical control system and interface connected to and adapted to control the prism rotating module and the moveable holder module;
wherein with or without setting an optical path sensor which is optionally disposed in front of, behind, or onto the thin prisms, and the optical path sensor is an accessory part combined with or without the thin prisms, and the optical path sensor is provided with a plurality of photosensors, with either all of the photosensors being adapted for detecting light beams projected along the same direction, or some of the photosensors being adapted for detecting light beams from several different directions, and the optical path sensor is so connected to the Electromechanical control system and interface as to control output of light beams;
wherein the mirror assembly is useful in illumination, heat application, photo-thermal power generation, photovoltaic power generation, heat extraction air conditioner, and thermal storage, and adapted for adjusting beam convergence and energy distribution at various sites and devices according to instructions, or for tracking and directing light beams towards a moveable target;
wherein the light beams output from the light guide mirror assembly is re-concentrated into a directional light beam with a greatly increased application distance, which is useful in cutting large objects, such as rocks, buildings and tunnels, reforming landscape, also by heating sandstone into molten lava and using casting or printing process to perform construction work, directional beam communication, light beam probing and light beam energy transmission.

2. The light guide mirror assembly according to claim 1, wherein at least one basic unit is provided nearby with a reflective mirror, which is arranged with predetermined spacing, inclined angle, and position and secured by a fastener or the moveable holder module.

3. The light guide mirror assembly according to claim 1, which is surrounded by a signal reflection casing configured without blocking front and rear sides of the light guide mirror assembly, wherein the signal reflection casing is formed at its front and rear ends with at least one light beam outlet/inlet, respectively, and wherein the light guide mirror assembly is provided at its rear side with at least one first signal loading module, which is electrically connected to the Electromechanical control system and interface; and
wherein the signal reflection casing is provided at its outer layer or front side with at least one second signal loading module, which is electrically connected to the Electromechanical control system and interface.

4. The light guide mirror assembly according to claim 1, wherein the light guide mirror assembly or the thin prisms are installed, alone or more or in an array, inside a flat weatherproof sealing structure and the sealing structure is in turn mounted on a conventional roof, wherein the types of the flat weatherproof sealing structure include plane, arc surface, spherical, or other curved surfaces, and wherein the flat weatherproof sealing structure is directly mounted on, replaces, or constitutes the roof, or the flat weatherproof sealing structure is installed on a stable platform or static plane built on a high place, or a plurality of the flat weatherproof sealing structures are fabricated into a polyhedral architecture adapted for receiving more light as compared with a single piece of the planar-shaped flat weatherproof sealing structure, and wherein the polyhedral architecture is built various by at least three pieces of the flat weatherproof sealing structures or at least two pieces of the flat weatherproof sealing structures with the ground surface or platform;

wherein the flat weatherproof sealing structure is composed of bases and/or the signal reflection casing;

wherein in the flat weatherproof sealing structure, the bases of each layer are arranged with predetermined spacing, inclined angle, and position, and including but not limited in the staggered relation, in variable quantities at different layers, in the array of the polyhedral architecture, or in variable relation by provided with a moveable holder module.

5. The light guide mirror assembly according to claim 1, wherein the light guide mirror assembly or the thin prisms are installed, alone or more or in an array, on a hover vehicle or a space-based vehicle selected from the group consisting of an aerostat platforms such as hot air balloons, etc., a mechanical air-staying platforms such as Dyson balls, space elevators, etc., an orbital platforms such as satellites, space stations, etc., a powered hover platforms such as drones, etc., and wherein the light guide mirror assembly installed on the hover vehicle or the space-based vehicle is useful for outdoors weather control, pest control and fire extinguishment.

6. The light guide mirror assembly according to claim 1, wherein the light guide mirror assembly or the thin prisms are installed, alone or more or in an array, on a dynamic steering tracking platform which comprises a light source vector sensor, a steering arm or a swinging device, and wherein the light source vector sensor, the dynamic steering tracking platform or the steering arm or the swinging device are electrically connected to the Electromechanical control system and interface, and wherein the steering arm comprises a horizontal rotating module and a pitch angle lifting/rotary module and is usually mounted next to the mirror assembly, the thin prisms or the dynamic steering tracking platform, and wherein the swinging device is selected from the group consisting of a telescopic module, a bearing, a universal tube, a base rotating module, a telescopic slide member, a flipping device or a rolling device, and adapted to swing or move the light guide mirror assembly, the thin prisms or the flat weatherproof sealing structure.

7. The light guide mirror assembly according to claim 1, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;

wherein the light-receiving end and the terminal ends are either secured at fixed positions or moveable by being mounted on a translational member or a mobile member;

wherein the terminal ends of the light pipes are provided with or without an adjustable reflective mirror, an optical diffuser or a light scatterer, as a means to adjust the output at the terminal ends.

8. The light guide mirror assembly according to claim 2, wherein the light guide mirror assembly or the thin prisms are installed, alone or more or in an array, inside a flat weatherproof sealing structure and the sealing structure is in turn mounted on a conventional roof, wherein the types of the flat weatherproof sealing structure include plane, arc surface, spherical, or other curved surfaces, and wherein the flat weatherproof sealing structure is directly mounted on, replaces, or constitutes the roof, or the flat weatherproof sealing structure is installed on a stable platform or static plane built on a high place, or a plurality of the flat weatherproof sealing structures are fabricated into a polyhedral architecture adapted for receiving more light as compared with a single piece of the planar-shaped flat weatherproof sealing structure, and wherein the polyhedral architecture is built various by at least three pieces of the flat weatherproof sealing structures or at least two pieces of the flat weatherproof sealing structures with the ground surface or platform;

wherein the flat weatherproof sealing structure is composed of bases and/or the signal reflection casing;

wherein in the flat weatherproof sealing structure, the bases of each layer are arranged with predetermined spacing, inclined angle, and position, and including but not limited in the staggered relation, in variable quantities at different layers, in the array of the polyhedral architecture, or in variable relation by provided with a moveable holder module.

9. The light guide mirror assembly according to claim 2, wherein the light guide mirror assembly or the thin prisms are installed, alone or more or in an array, on a hover vehicle or a space-based vehicle selected from the group consisting of an aerostat platforms such as hot air balloons, etc., a mechanical air-staying platforms such as Dyson balls, space elevators, etc., an orbital platforms such as satellites, space stations, etc., a powered hover platforms such as drones, etc., and wherein the light guide mirror assembly installed on the hover vehicle or the space-based vehicle is useful for outdoors weather control, pest control and fire extinguishment.

10. The light guide mirror assembly according to claim 2, wherein the light guide mirror assembly or the thin prisms are installed, alone or more or in an array, on a dynamic steering tracking platform which comprises a light source vector sensor, a steering arm or a swinging device, and wherein the light source vector sensor, the dynamic steering tracking platform or the steering arm or the swinging device are electrically connected to the Electromechanical control system and interface, and wherein the steering arm comprises a horizontal rotating module and a pitch angle lifting/rotary module and is usually mounted next to the mirror assembly, the thin prisms or the dynamic steering tracking platform, and wherein the swinging device is selected from the group consisting of a telescopic module, a bearing, a universal tube, a base rotating module, a telescopic slide member, a flipping device or a rolling device, and adapted to swing or move the light guide mirror assembly, the thin prisms or the flat weatherproof sealing structure.

11. The light guide mirror assembly according to claim 3, wherein the light guide mirror assembly or the thin prisms are installed, alone or more or in an array, inside a flat weatherproof sealing structure and the sealing structure is in turn mounted on a conventional roof, wherein the types of the flat weatherproof sealing structure include plane, arc surface, spherical, or other curved surfaces, and wherein the flat weatherproof sealing structure is directly mounted on, replaces, or constitutes the roof, or the flat weatherproof sealing structure is installed on a stable platform or static plane built on a high place, or a plurality of the flat weatherproof sealing structures are fabricated into a polyhedral architecture adapted for receiving more light as compared with a single piece of the planar-shaped flat weatherproof sealing structure, and wherein the polyhedral architecture is built various by at least three pieces of the flat weatherproof sealing structures or at least two pieces of the flat weatherproof sealing structures with the ground surface or platform;

wherein the flat weatherproof sealing structure is composed of bases and/or the signal reflection casing;
wherein in the flat weatherproof sealing structure, the bases of each layer are arranged with predetermined spacing, inclined angle, and position, and including but not limited in the staggered relation, in variable quantities at different layers, in the array of the polyhedral architecture, or in variable relation by provided with a moveable holder module.

12. The light guide mirror assembly according to claim 3, wherein the light guide mirror assembly or the thin prisms are installed, alone or more or in an array, on a hover vehicle or a space-based vehicle selected from the group consisting of an aerostat platforms such as hot air balloons, etc., a mechanical air-staying platforms such as Dyson balls, space elevators, etc., an orbital platforms such as satellites, space stations, etc., a powered hover platforms such as drones, etc., and wherein the light guide mirror assembly installed on the hover vehicle or the space-based vehicle is useful for outdoors weather control, pest control and fire extinguishment.

13. The light guide mirror assembly according to claim 3, wherein the light guide mirror assembly or the thin prisms are installed, alone or more or in an array, on a dynamic steering tracking platform which comprises a light source vector sensor, a steering arm or a swinging device, and wherein the light source vector sensor, the dynamic steering tracking platform or the steering arm or the swinging device are electrically connected to the Electromechanical control system and interface, and wherein the steering arm comprises a horizontal rotating module and a pitch angle lifting/rotary module and is usually mounted next to the mirror assembly, the thin prisms or the dynamic steering tracking platform, and wherein the swinging device is selected from the group consisting of a telescopic module, a bearing, a universal tube, a base rotating module, a telescopic slide member, a flipping device or a rolling device, and adapted to swing or move the light guide mirror assembly, the thin prisms or the flat weatherproof sealing structure.

14. The light guide mirror assembly according to claim 4, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;
wherein the light-receiving end and the terminal ends are either secured at fixed positions or moveable by being mounted on a translational member or a mobile member;
wherein the terminal ends of the light pipes are provided with or without an adjustable reflective mirror, an optical diffuser or a light scatterer, as a means to adjust the output at the terminal ends.

15. The light guide mirror assembly according to claim 5, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;
wherein the light-receiving end and the terminal ends are either secured at fixed positions or moveable by being mounted on a translational member or a mobile member;
wherein the terminal ends of the light pipes are provided with or without an adjustable reflective mirror, an optical diffuser or a light scatterer, as a means to adjust the output at the terminal ends.

16. The light guide mirror assembly according to claim 6, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;
wherein the light-receiving end and the terminal ends are either secured at fixed positions or moveable by being mounted on a translational member or a mobile member;
wherein the terminal ends of the light pipes are provided with or without an adjustable reflective mirror, an optical diffuser or a light scatterer, as a means to adjust the output at the terminal ends.

17. The light guide mirror assembly according to claim 8, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;
wherein the light-receiving end and the terminal ends are either secured at fixed positions or moveable by being mounted on a translational member or a mobile member;
wherein the terminal ends of the light pipes are provided with or without an adjustable reflective mirror, an optical diffuser or a light scatterer, as a means to adjust the output at the terminal ends.

18. The light guide mirror assembly according to claim 9, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;
wherein the light-receiving end and the terminal ends are either secured at fixed positions or moveable by being mounted on a translational member or a mobile member;
wherein the terminal ends of the light pipes are provided with or without an adjustable reflective mirror, an optical diffuser or a light scatterer, as a means to adjust the output at the terminal ends.

19. The light guide mirror assembly according to claim 10, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;

wherein the light-receiving end and the terminal ends are either secured at fixed positions or moveable by being mounted on a translational member or a mobile member;

wherein the terminal ends of the light pipes are provided with or without an adjustable reflective mirror, an optical diffuser or a light scatterer, as a means to adjust the output at the terminal ends.

20. The light guide mirror assembly according to claim 11, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;

wherein the light-receiving end and the terminal ends are either secured at fixed positions or moveable by being mounted on a translational member or a mobile member;

wherein the terminal ends of the light pipes are provided with or without an adjustable reflective mirror, an optical diffuser or a light scatterer, as a means to adjust the output at the terminal ends.

21. The light guide mirror assembly according to claim 12, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;

wherein the light-receiving end and the terminal ends are either secured at fixed positions or moveable by being mounted on a translational member or a mobile member;

wherein the terminal ends of the light pipes are provided with or without an adjustable reflective mirror, an optical diffuser or a light scatterer, as a means to adjust the output at the terminal ends.

22. The light guide mirror assembly according to claim 13, further comprising a plurality of light pipes which comprise the light-receiving ends arranged in intensive array beneath an output side of the light guide mirror assembly, and the terminal ends respectively arranged to plural positions and irradiation directions that light cannot directly reach, and wherein each of the light beam output from the light guide mirror assembly can be individually according to instructions to move to any of the light-receiving ends;

wherein the light-receiving end and the terminal ends are either secured at fixed positions or moveable by being mounted on a translational member or a mobile member;

wherein the terminal ends of the light pipes are provided with or without an adjustable reflective mirror, an optical diffuser or a light scatterer, as a means to adjust the output at the terminal ends.

\* \* \* \* \*